Aug. 15, 1939.   J. B. ARMITAGE   2,169,484
MACHINE-TOOL TRANSMISSION AND CONTROL MECHANISM
Filed June 11, 1937   11 Sheets-Sheet 1

INVENTOR
JOSEPH B. ARMITAGE
BY W. D. O'Connor
ATTORNEY

Aug. 15, 1939.  J. B. ARMITAGE  2,169,484

MACHINE-TOOL TRANSMISSION AND CONTROL MECHANISM

Filed June 11, 1937  11 Sheets-Sheet 2

INVENTOR
JOSEPH B. ARMITAGE
BY W. D. O'Connor
ATTORNEY

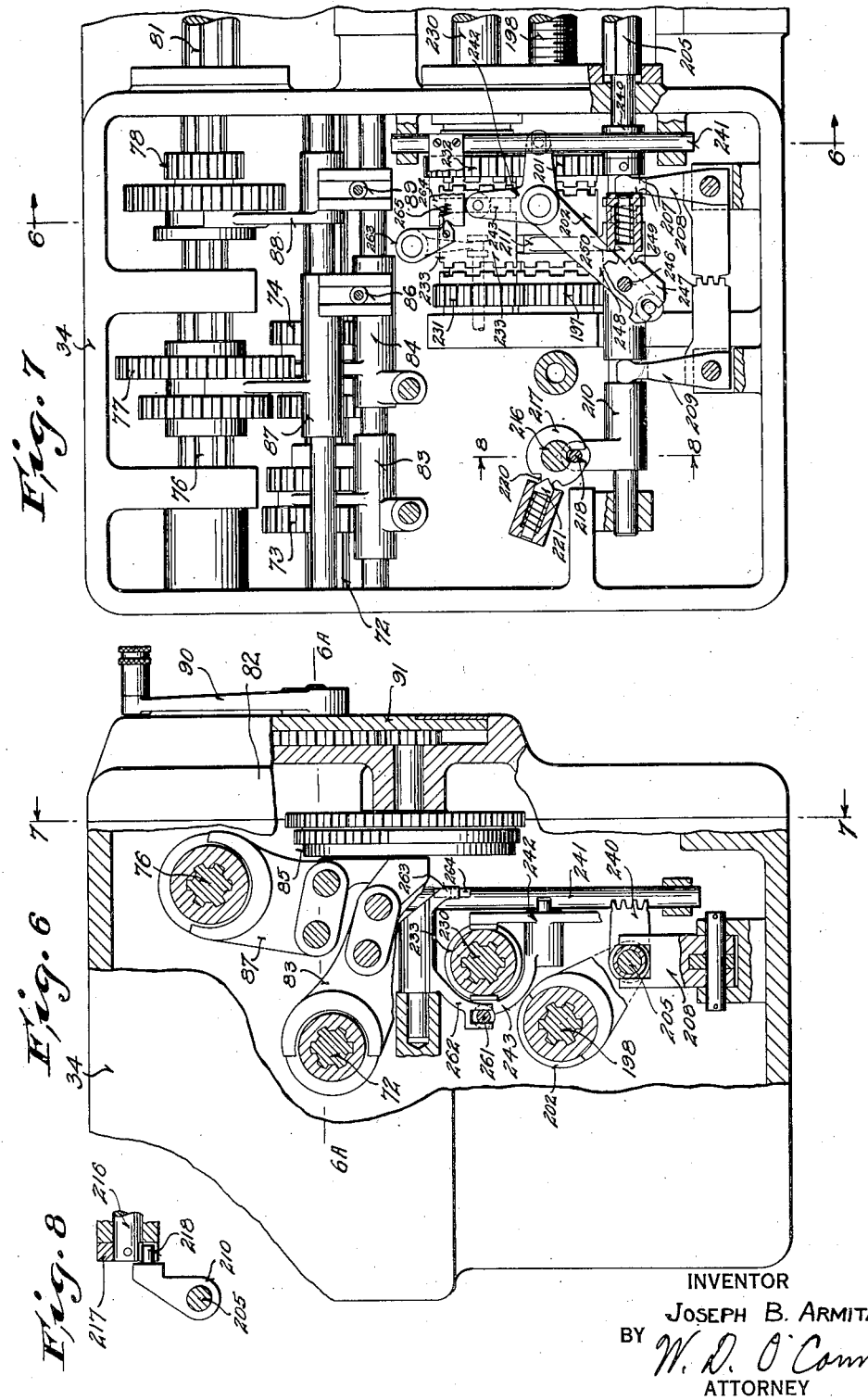

Aug. 15, 1939.   J. B. ARMITAGE   2,169,484
MACHINE-TOOL TRANSMISSION AND CONTROL MECHANISM
Filed June 11, 1937   11 Sheets-Sheet 6

INVENTOR
JOSEPH B. ARMITAGE
BY W. D. O'Connor
ATTORNEY

Aug. 15, 1939.   J. B. ARMITAGE   2,169,484
MACHINE-TOOL TRANSMISSION AND CONTROL MECHANISM
Filed June 11, 1937   11 Sheets-Sheet 7
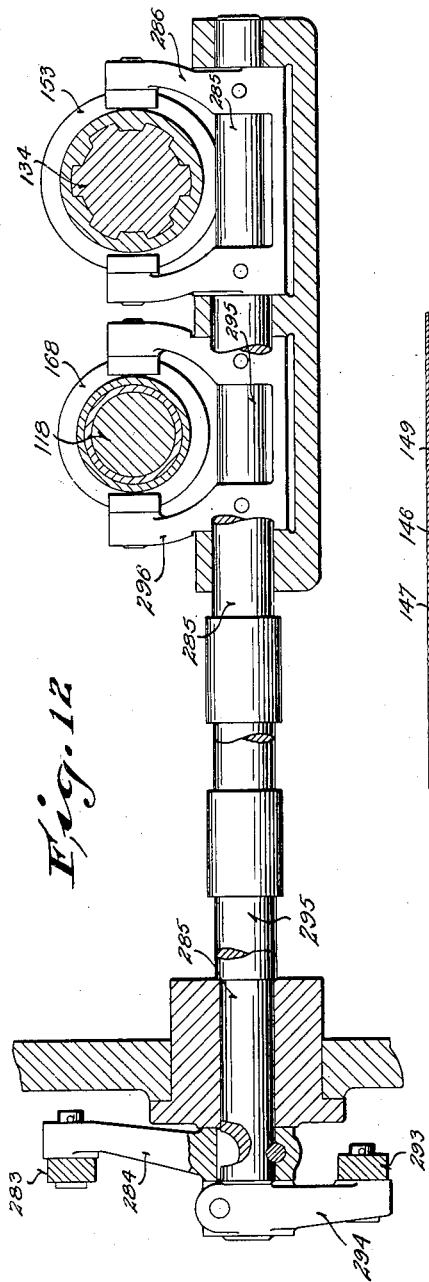
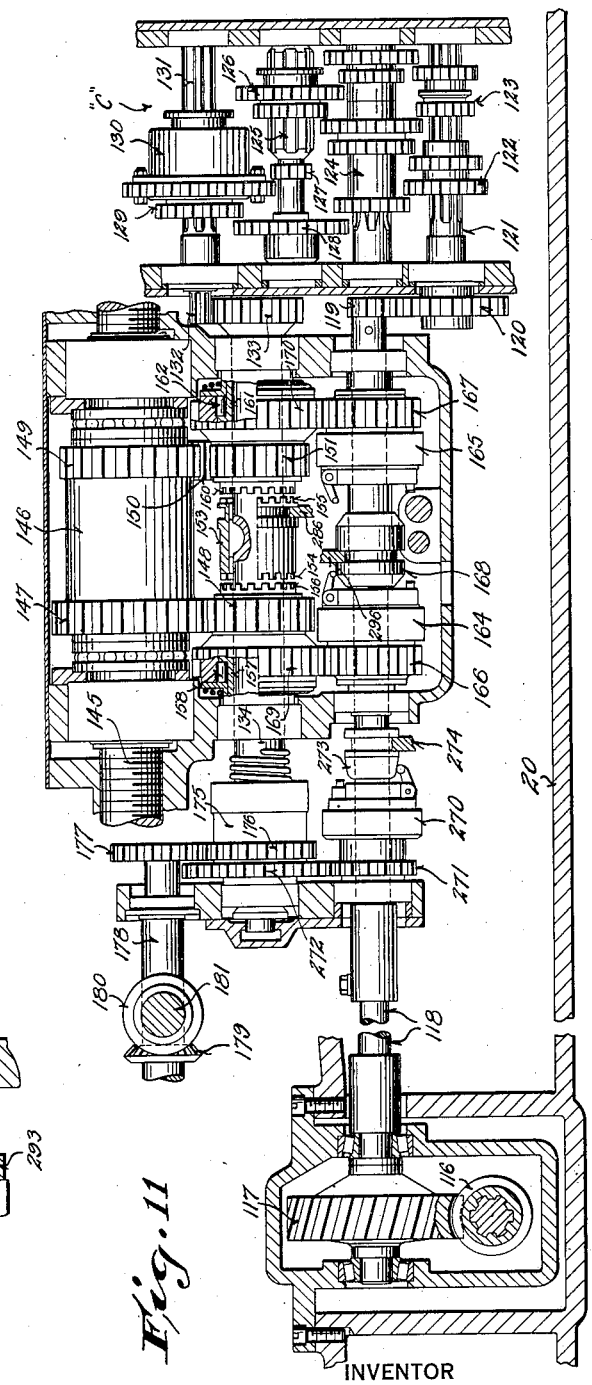
INVENTOR
JOSEPH B. ARMITAGE
BY W. D. O'Connor
ATTORNEY

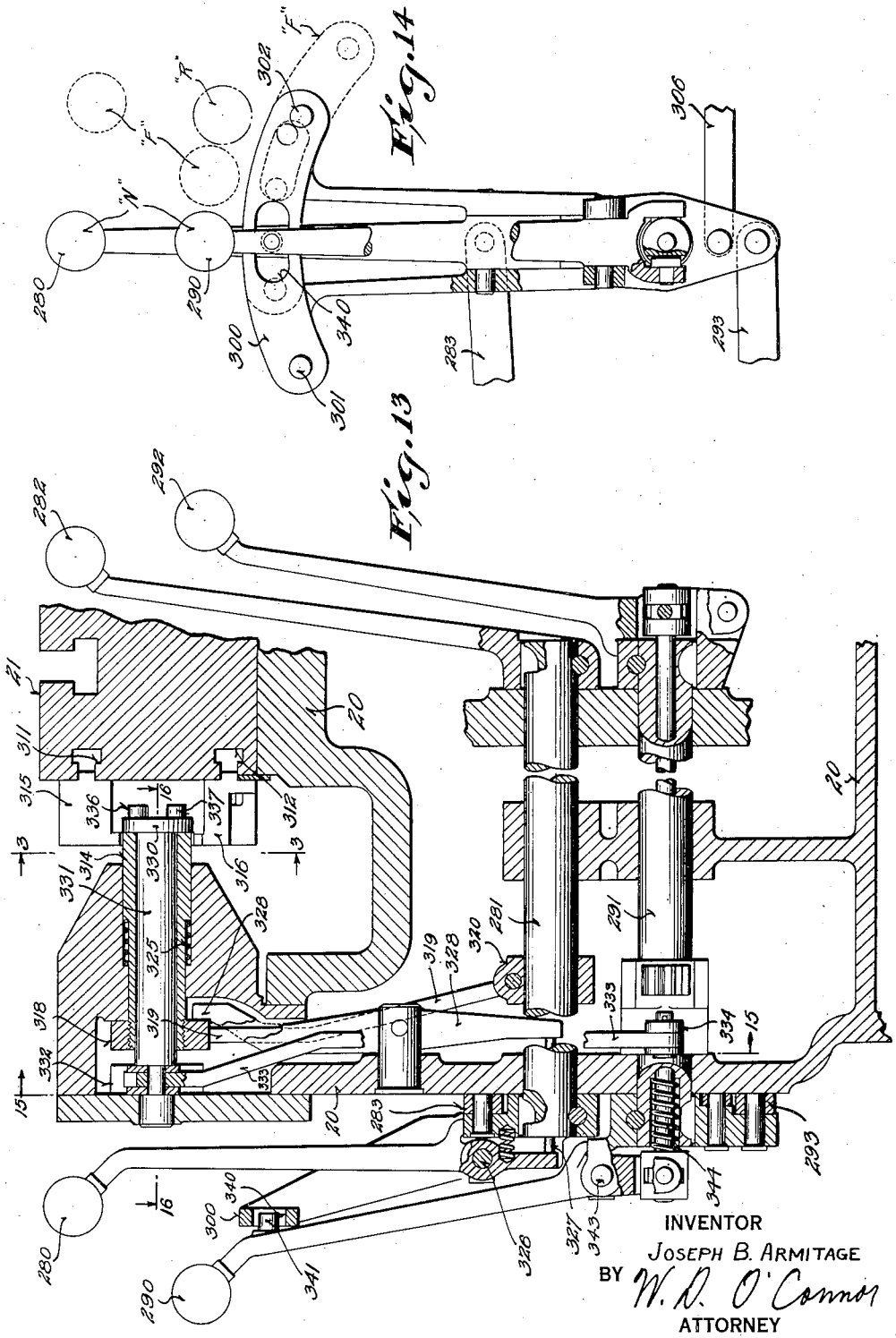

Aug. 15, 1939.   J. B. ARMITAGE   2,169,484
MACHINE-TOOL TRANSMISSION AND CONTROL MECHANISM
Filed June 11, 1937   11 Sheets-Sheet 9
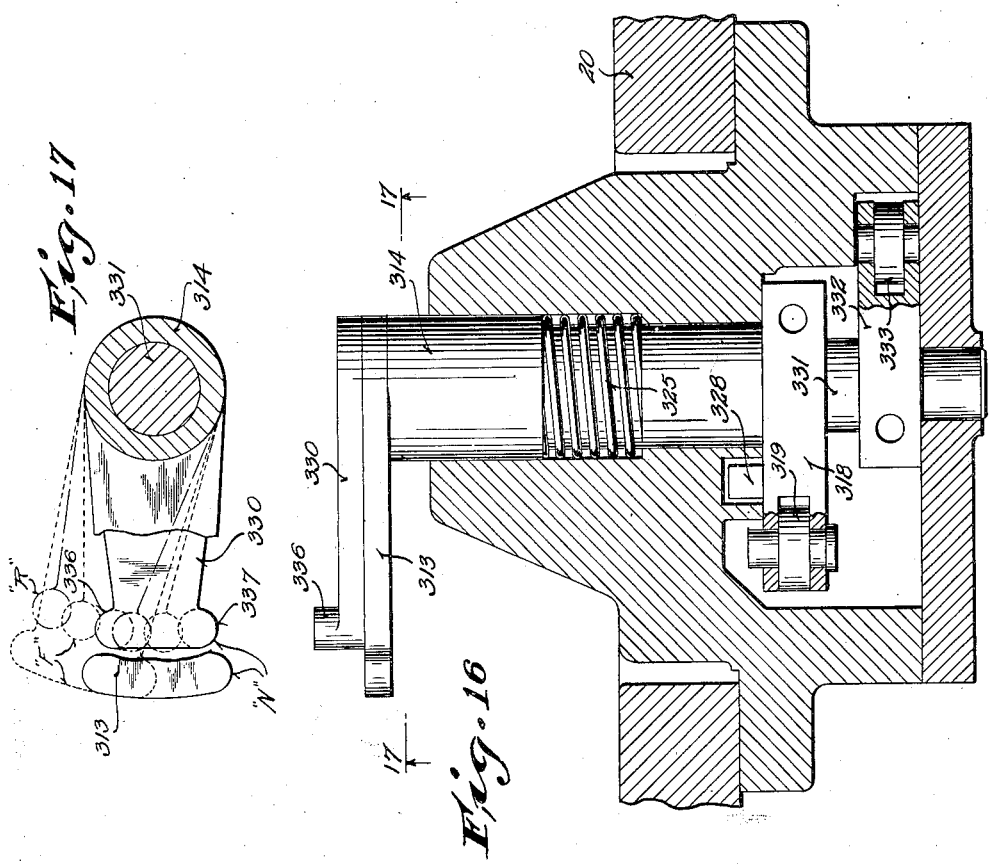
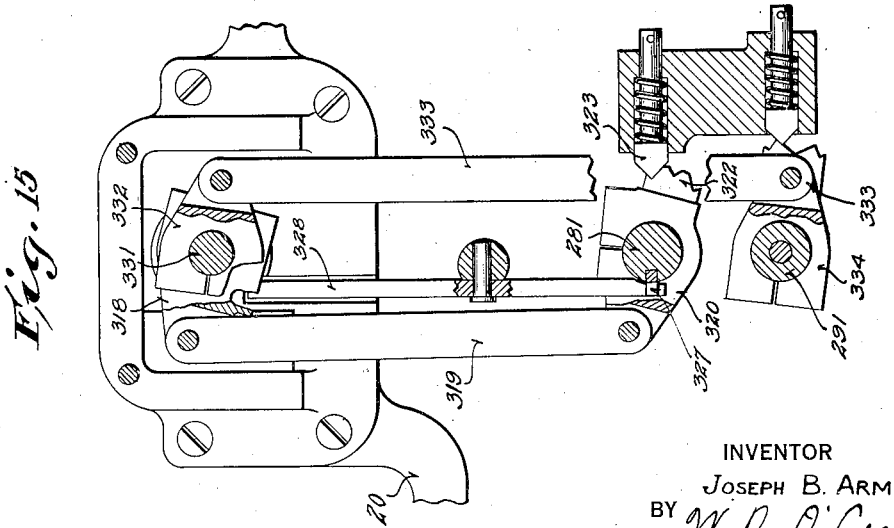
INVENTOR
JOSEPH B. ARMITAGE
BY *W. D. O'Connor*
ATTORNEY Aug. 15, 1939.   J. B. ARMITAGE   2,169,484
MACHINE-TOOL TRANSMISSION AND CONTROL MECHANISM
Filed June 11, 1937   11 Sheets-Sheet 10
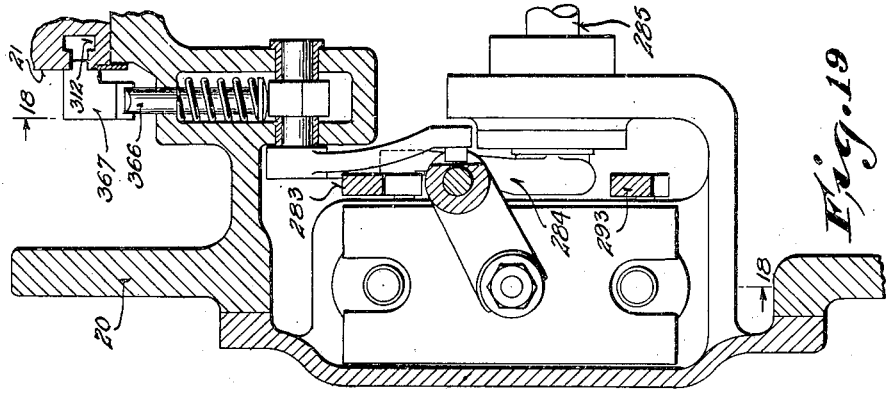
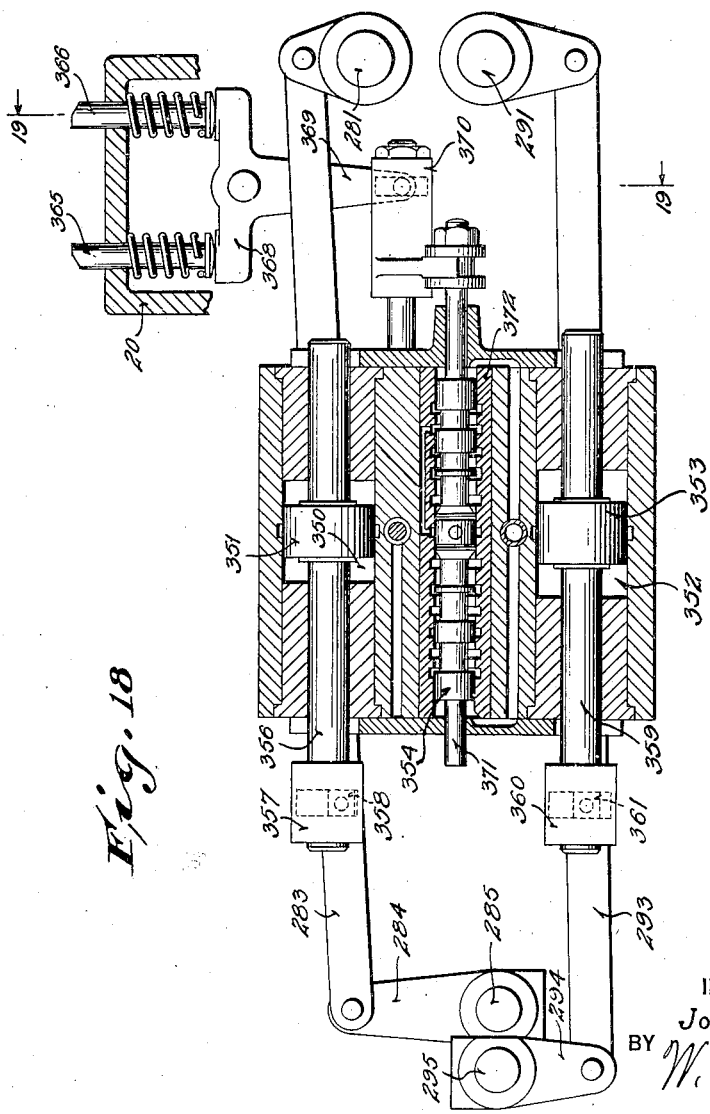
INVENTOR
JOSEPH B. ARMITAGE
BY
ATTORNEY Aug. 15, 1939.  J. B. ARMITAGE  2,169,484
MACHINE-TOOL TRANSMISSION AND CONTROL MECHANISM
Filed June 11, 1937   11 Sheets-Sheet 11
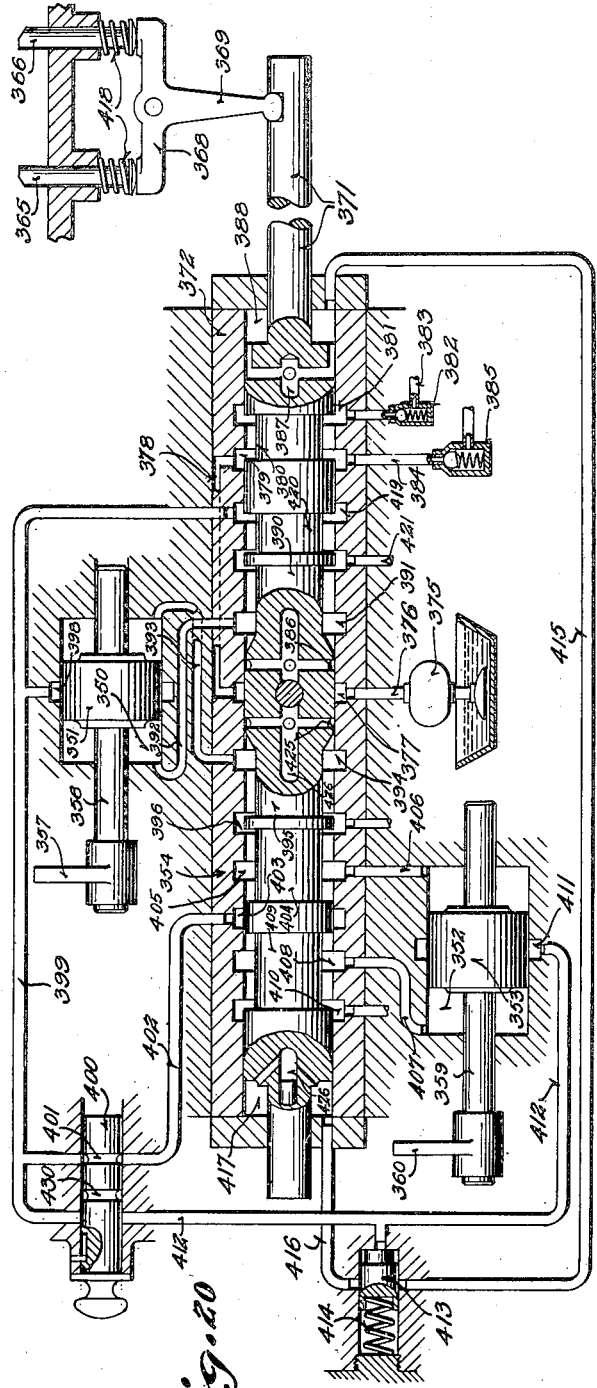
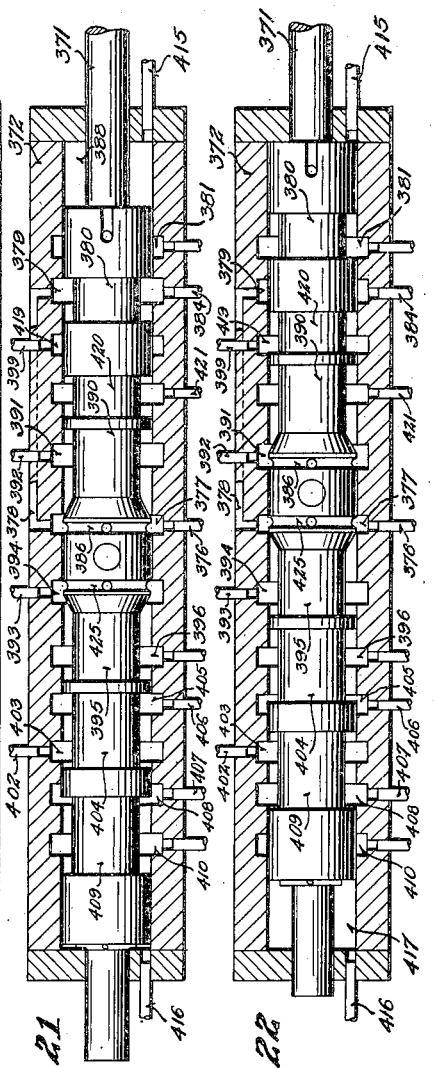
INVENTOR
JOSEPH B. ARMITAGE
BY W. D. O'Connor
ATTORNEY / Patented Aug. 15, 1939

2,169,484

UNITED STATES PATENT OFFICE 2,169,484

MACHINE-TOOL TRANSMISSION AND CONTROL MECHANISM

Joseph B. Armitage, Wauwatosa, Wis., assignor to Kearney & Trecker Corporation, West Allis, Wis., a corporation of Wisconsin Application June 11, 1937, Serial No. 147,685

37 Claims. (Cl. 90—21)

This invention relates generally to machine tools and more particularly to an improved power transmitting and controlling mechanism especially suitable for a milling machine.

A general object of the invention is to provide improved transmission mechanism and control apparatus for actuating and controlling the various movable elements of a machine tool, such as a milling machine or the like.

Another object of the invention is to provide improved transmission mechanism and control apparatus especially suitable for actuating and controlling the movable elements of a milling machine of the rail or planer type.

Another object is to provide an improved transmission mechanism for delivering power to a tool spindle movably mounted on a milling machine.

Another object is to provide an improved driving mechanism for actuating a tool spindle movably mounted on the rail of a rail type milling machine.

Another object is to provide an improved transmission mechanism for a milling machine of the rail type including a spindle speed changing mechanism mounted on the rail of the machine.

Another object is to provide an improved transmission mechanism for driving the vertical spindle of a rail type milling machine, including a speed changing mechanism mounted on the rail and a range changing mechanism mounted on the spindle carrying head.

Another object is to provide an improved reversing and rate changing apparatus for the driving mechanism of a machine tool.

Another object is to provide a transmission and controlling mechanism adapted to effect feeding movements of a plurality of elements of a machine tool at a common selected feed rate, and to provide for selectively moving any one of the elements at rapid traverse rate without disturbing the movement of any other element.

Another object is to provide an improved transmission mechanism for moving a heavy work table, the mechanism being controlled by a single lever to effect movement of the table selectively in either direction at rapid traverse rate smoothly and without clashing of gears or positive clutches.

Another object is to provide a transmission mechanism for a machine tool work table, incuding a separate friction clutch for driving the table at rapid traverse rate in each direction.

Another object is to provide control means for a machine tool table driving transmission including a separate friction clutch for driving the table at rapid traverse rate in each direction and interlocking means to prevent engagement of a rapid traverse friction clutch when the means for effecting feeding movement of the table in the opposite direction is engaged.

Another object is to provide an improved manually operated control apparatus for the table driving transmission mechanism of a machine tool.

A further object is to provide an improved automatic trip mechanism for controlling the table driving apparatus of a machine tool.

A still further object is to provide an improved machine tool table driving mechanism and control apparatus including power operated automatic reversing mechanism.

According to this invention, a large milling machine of the rail or planer type, having a heavy work supporting table and a vertically movable rail carrying a tool spindle, is provided with improved controlling and driving mechanism for actuating the table and the spindle. The table controlling and driving mechanism includes a rapid traverse rate driving apparatus having an individual friction clutch for actuating the table in each direction, the arrangement being such that the table may be moved selectively at rapid traverse rate in either direction under the control of a single lever without the necessity of engaging positive clutches or sliding gears. Movement of the table at feed rate is effected by means of a positive clutch driving an over-running clutch in such manner that transition from feed rate to rapid traverse rate may be accomplished smoothly without stopping the table or disengaging the positive clutch, the control levers being interlocked to prevent engagement of the friction clutch for movement at rapid traverse rate in one direction when the positive clutch for effecting feeding movement in the opposite direction is engaged. The rate of feeding movement is regulated by a quick change gear shifting mechanism that is adjusted by means of a single control lever associated with a dial indicating the rate of feed. Power for effecting feeding movements of the vertical spindle in horizontal and vertical directions is likewise derived from the feed rate gear changing mechanism, means being provided on the rail for determining the path of movement and the direction of movement of the spindle. An over-running clutch is provided in the spindle feed drive to permit rapid traverse movement thereof upon engagement of a spindle rapid traverse friction clutch, the feeding movement and rapid traverse movement of the spindle being independent of movement of the table. By this arrangement, either the table or the spindle may be moved at rapid traverse rate in either direction while the other remains stationary or is moving at feed rate. Automatic control of feeding and of rapid traverse movements of the table may be effected by trip dogs carried by the table, and automatic reversal of the direction of movement of the table may be effected by means of hydraulic clutch shifting mechanism associated with trip mechanism responsive to movement of the table. Power for rotating the vertical spindle on the rail is derived from a motor mounted in the frame of the machine and is transmitted at relatively high speed to a quick change gear shifting mechanism mounted on the rail and operative by a single control lever, a dial being provided to indicate the spindle speed. A range changing mechanism is provided on the spindle supporting head for effecting operation of the spindle in either of two speed ranges, the spindle speed being regulated by cooperative action of the range changing mechanism and the speed changing mechanism on the rail. The advantage of this arrangement is that at low spindle speeds, only the spindle and associated mechanism is subjected to high driving torque, the transmission mechanism from the motor to the speed changer on the rail continuing to operate at its normal high speed and to transmit power at low torque, whereby minimum deflection or twisting action is experienced in the transmission train.

The foregoing and other objects, which will become more fully apparent from the following detailed description of a machine tool exemplifying a preferred embodiment of the invention, may be achieved by the particular structure shown in and described in connection with the accompanying drawings, of which:

Fig. 6 is a view of the gear box, partly in front elevation and partly in section on the plane represented by the line 6—6 in Fig. 7;

Fig. 7 is a view of the gear box in right side elevation with the cover removed and with some parts in section on the plane represented by the line 7—7 in Fig. 6;

Fig. 8 is a detailed sectional view of part of the control mechanism taken on the plane represented by the line 8—8 in Fig. 7;

Fig. 11 is a fragmentary developed frontal view of the table moving feed direction and rate changing mechanism in the bed of the machine, shown partly in section taken longitudinally of the work table;

Fig. 12 is a fragmentary view of the clutch-shifting mechanism for the table moving transmission, partly in section on the plane represented by the line 12—12 in Fig. 2;

Fig. 3 is a view of the table controlling levers and automatic trip mechanism taken in transverse section on the plane represented by the line 13—13 in Fig. 2;

Fig. 14 is a frontal view of the control levers and interlocking mechanism, taken from the left in Fig. 13 and indicating various operating positions thereof;

Fig. 15 is a frontal view of the control mechanism linkage, taken on the plane represented by the line 15—15 in Fig. 13;

Fig. 16 is a plan view of the tripping arms and associated mechanism partly in section on the plane represented by the line 16—16 in Fig. 13;

Fig. 17 is a detail view of the tripping arms taken on the plane represented by the line 17—17 in Fig. 16, and indicating the positions of the arms corresponding to the positions of the levers indicated in Fig. 14;

Fig. 18 is a somewhat diagrammatic view of hydraulically actuated power reversing mechanism for the table driving transmission taken partly in longitudinal section on the plane represented by the line 18—18 in Fig. 19;

Fig. 19 is a view of the reversing mechanism taken in transverse section on the plane represented by the line 19—19 in Fig. 18;

Fig. 20 is a schematic diagram of the hydraulic control circuit for the reversing mechanism, the control valve and other parts being shown in longitudinal section generally similar to Fig. 18;

Fig. 21 is a view in longitudinal section of the control valve shown in Fig. 20 but with the valve plunger in a different position; and Fig. 22 is a view similar to Fig. 21 but with the valve plunger in still another position.

Figure 1:
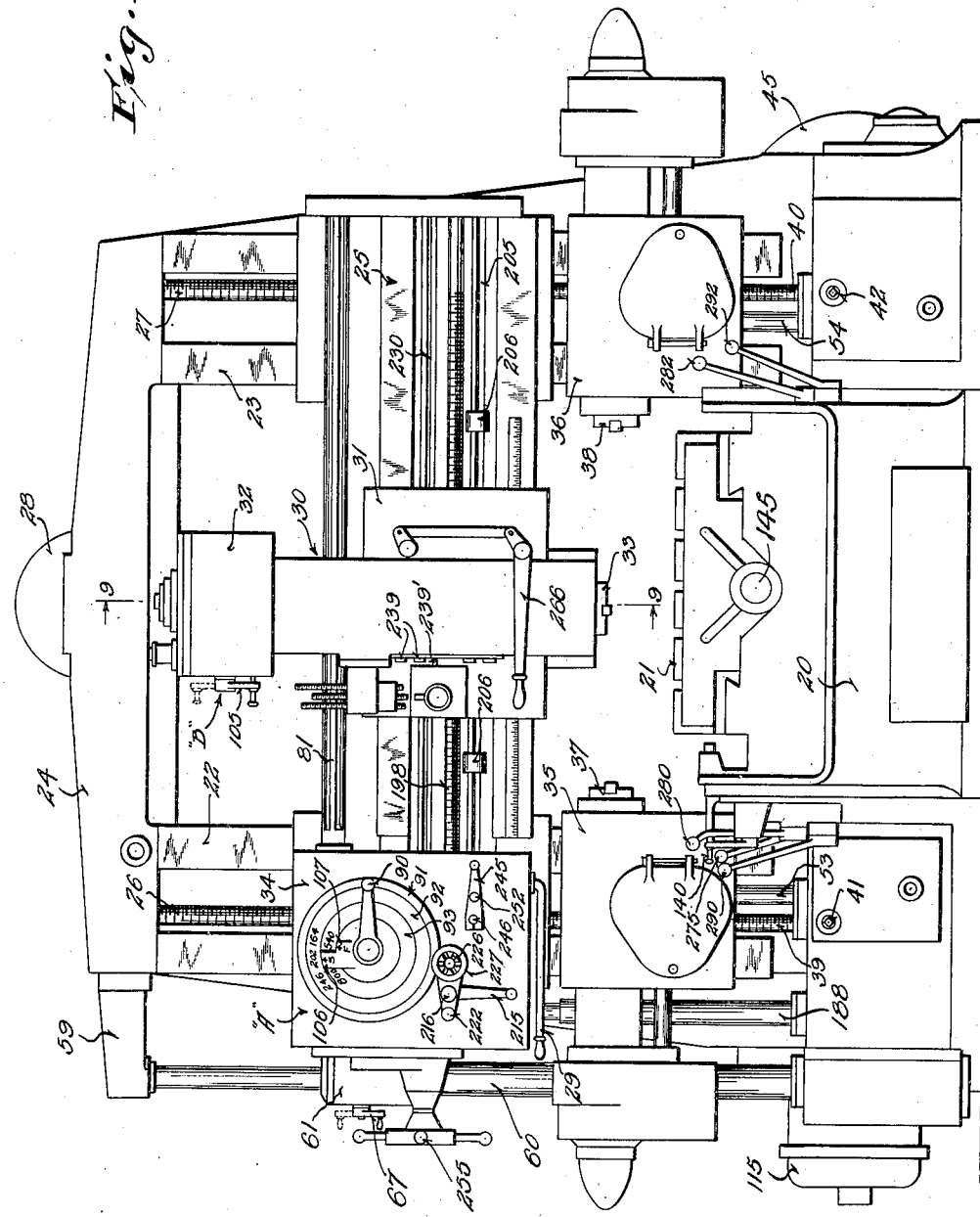
Figure 1 is a view in right end elevation of a milling machine of the rail or planer type, constituting an embodiment of the novel features of this invention.

The particular machine tool shown in the drawings as an example of apparatus constituting a preferred embodiment of the invention, is a milling machine of the rail or planer type.

Referring particularly to Fig. 1, in which the machine is shown as a whole, it may be seen that the general structure includes essentially a base or bed 20 that carries a slidably mounted work supporting table 21 arranged for longitudinal reciprocatory feeding movement. Secured to the bed 20 at each side of the work table 21 are forward and rear uprights or side columns 22 and 23 respectively that are rigidly connected at their tops by a cross head or tie rail cross member 24 in manner to constitute with the bed 20 a rigid main frame structure for supporting the operating mechanism of the machine.

The uprights 22 and 23 carry a cross rail 25 that is slidably mounted thereon for vertical adjustment, drive screws 26 and 27 being provided in the columns 22 and 23 respectively in engagement with the ends of the rail for elevating or lowering it. A motor 28 is mounted on the cross head 24 and is operatively connected to actuate the driving screws 26 and 27 simultaneously in manner to move both ends of the rail synchronously, as more fully set forth in my Patent No. 2,081,288, issued May 25, 1937, and entitled "Machine tool transmission and control". After the rail 25 has been moved to adjusted position, it may be clamped to the columns by actuating a clamping lever 29.

Slidably mounted on the rail 25 for horizontal movement relative thereto and for vertical movement bodily therewith, is a tool spindle supporting unit 30. The spindle supporting unit 30 includes a saddle 31 which slidably engages the rail 25 and that carries a spindle supporting head 32 arranged for vertical sliding movement relative to the saddle. The spindle head 32 serves to rotatably support a vertically disposed tool carrying spindle 33 in position to present a rotatable cutting tool in cooperating relationship with a workpiece mounted on the reciprocatory work table 21, the arrangement being such that the cutting tool may be moved vertically or transversely relative to the table. For transmitting power to the spindle 33 to rotate it, there is provided a transmission gear box 34 which is mounted on the forward end of the rail 25 in manner to move vertically with the rail.

Slidably mounted on the columns 22 and 23 beneath the cross rail 25 are spindle supporting units 35 and 36 respectively, carrying horizontally disposed tool spindles 37 and 38. The spindle units 35 and 36 are arranged to be adjusted vertically along the columns by driving screws 39 and 40 respectively, which may be operated manually by a hand crank applied to the square ends of associated actuating shafts 41 and 42. The spindles 37 and 38 are also arranged for longitudinal horizontal adjustment, for adjusting the position of cutters carried thereby relative to a workpiece on the table 21, as more fully described in my previously mentioned patent.

Figure 4:
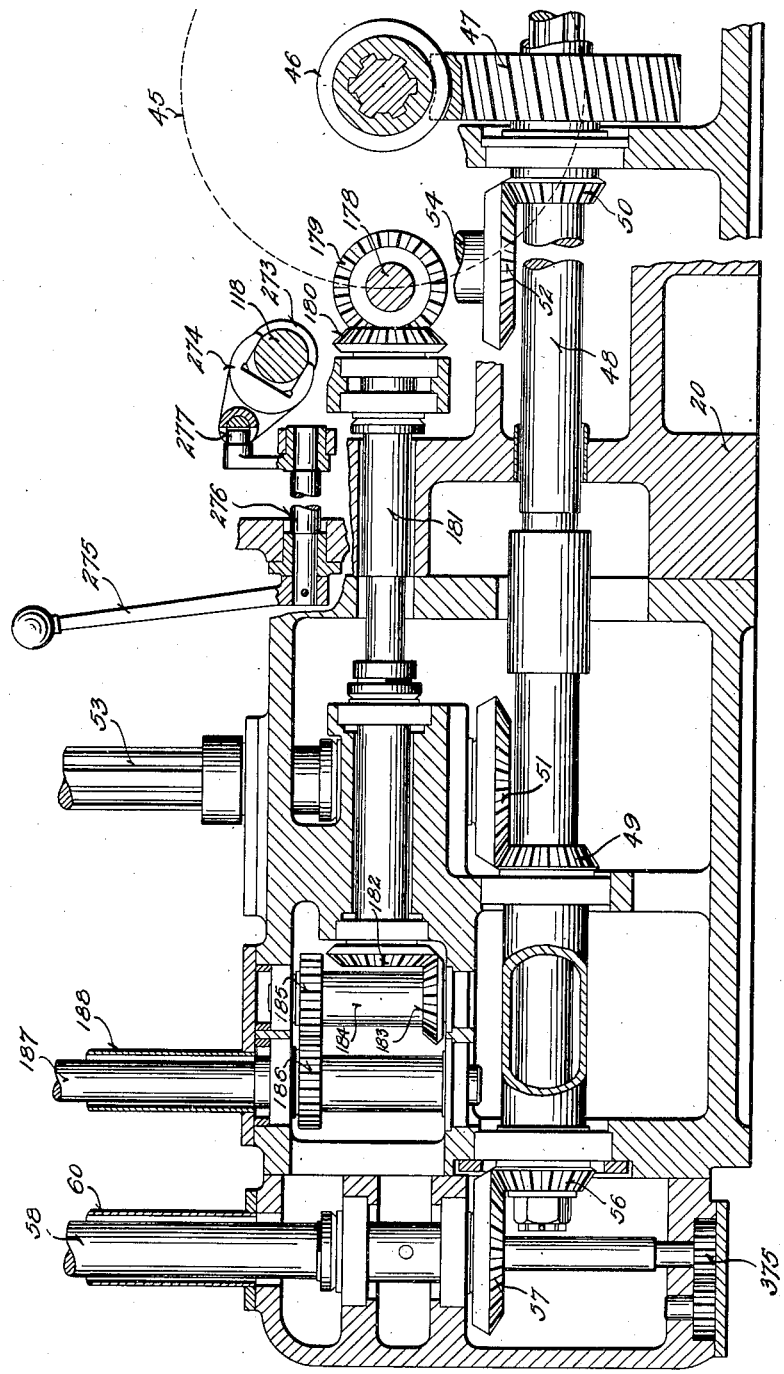
Fig. 4 is a fragmentary view showing parts of the power transmission trains, taken in transverse section through the machine frame in the region indicated generally by the lines 4—4 in Fig. 2.

Power for rotating the tool supporting spindles 33, 37, and 38 is derived from a spindle driving motor 45, Fig. 1, that is disposed lengthwise of the bed 20 adjacent to the rear upright 23. As shown in Fig. 4, the shaft of the motor 45 is connected to a worm 46, which engages with and drives a worm wheel 47 on the end of a main driving shaft 48 extending transversely of the machine frame just to the right of the uprights. In the region of each upright, the shaft 48 is provided with a bevel pinion, represented in Fig. 4 by pinons 49 and 50 respectively, which mesh with bevel gears 51 and 52 on the lower ends of vertically disposed splined shafts 53 and 54, having sliding connections with the respective spindle supporting units 35 and 36 for driving the horizontal spindles 37 and 38 in manner more fully described in my previously mentioned patent.

The main driving shaft 48 is extended forward at the front of the machine, and is provided with a bevel pinion 56 which engages a bevel gear 57 on the lower end of a vertically disposed splined shaft 58 which transmits power for driving the vertically disposed spindle 33 on the cross rail 25. As may be seen in Fig. 1, the vertical shaft 58 is journaled at its upper end in the end of a bracket 59 extending forward from the cross head 24, telescoping guard tubes 60 being arranged to enclose the shaft and protect it from foreign matter and from injury.

Figure 5:
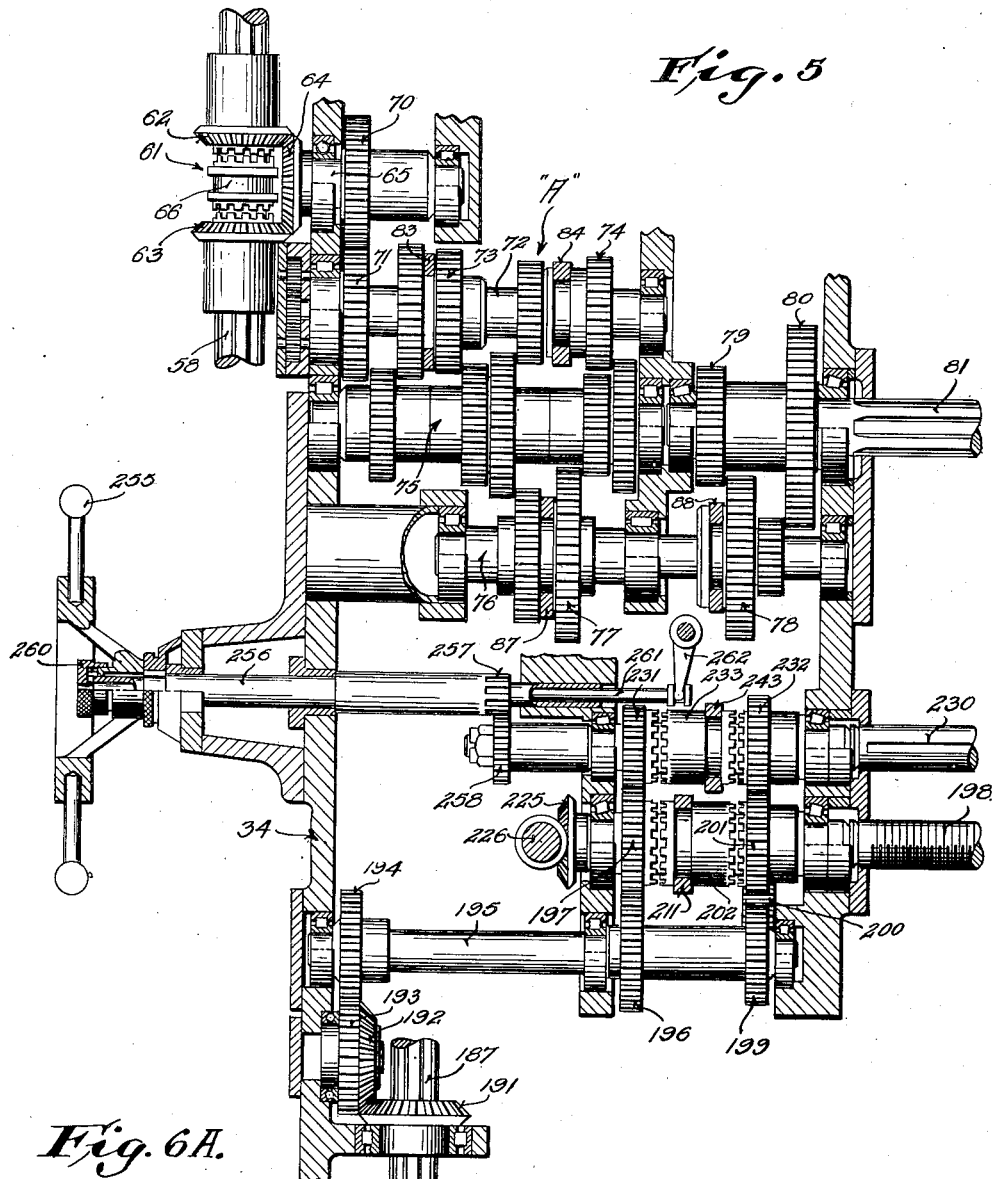
Fig. 5 is a developed, partially diagrammatic view of the spindle speed changing transmission mechanism and spindle movement controlling mechanism in the gear box on the rail of the machine.

As appears in Figs. 1 and 5, the splined shaft 58 extends upward through and has sliding engagement with a reversing mechanism 61 that is associated with a quick change speed adjusting mechanism A housed within the gear box 34 on the forward end of the rail 25, the gear box and associated mechanism being vertically movable bodily with the rail. The reversing mechanism comprises two bevel pinions 62 and 63 rotatably mounted concentric with the vertical shaft 58, and both meshing with a pinion 64 on an input shaft 65 constituting part of the speed changer A. Between the pinions 62 and 63 is a slidably mounted reversing clutch sleeve 66 that is splined on and driven by the shaft 58 and that may be moved by a reversing lever 67, shown in Fig. 1, to engage clutch teeth on its ends with complementary clutch teeth on the pinions 62 and 63 selectively. By engaging one or the other of the pinions 62 and 63, the speed changer input shaft 65 may be caused to rotate in one or the other direction and consequently the spindle 33 may be driven thereby in either direction, a neutral position being provided in which the clutch collar 66 is disengaged from both of the reversing pinions for disconnecting the drive train to the vertical spindle.

As shown in Fig. 5, the input shaft 65 of the speed changer A carries a gear 70 which meshes with and drives a gear 71 on a primary shaft 72 journaled in the gear box 34. The shaft 72 has slidably mounted thereon two gear couplets 73 and 74 respectively, which may be shifted to mesh the gears thereof with complementary gears of an idler gear cluster 75. A secondary shaft 76 disposed parallel with the shaft 72 is provided with a slidably mounted couplet 77, the gears of which may be engaged selectively with complementary gears of the idler cluster 75 in manner to be driven thereby. The secondary shaft 76 is also provided with a couplet 78 that is slidably mounted to engage its gears with and drive gears 79 and 80 respectively that are secured on a horizontally disposed splined output shaft 81 which extends lengthwise of the rail 25 and functions to transmit power at a selected rate from the speed changer A to the movable spindle supporting unit 30.

Figure 6A:
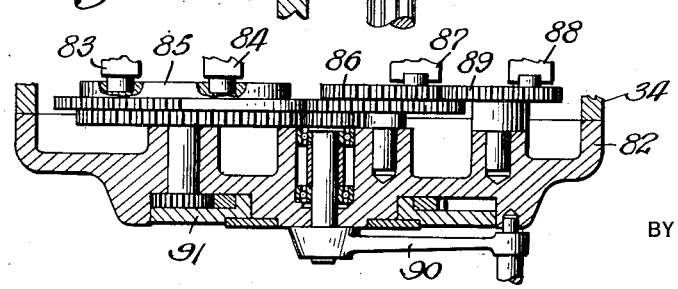
Fig. 6a is a fragmentary view of the spindle speed control mechanism in section on the plane represented by the line 6a—6a in Fig. 6.

As shown in Figs. 5, 6 and 7, the gear couplets 73 and 74 on the primary shaft 72 are engaged by shifting forks 83 and 84 respectively, that cooperate with and are shifted by a cam groove in a cam plate 85 which is rotatably mounted on the inner surface of a side cover plate 82 of the housing 34, as shown in Fig. 6a. Likewise, the couplets 77 and 78 on the secondary shaft 76 are also engaged by shifting forks 87 and 88 that cooperate respectively with eccentrically disposed rollers carried by control plates constituted by intermeshing gears 86 and 89 that are rotatably mounted on the side cover plate 82 within the housing 34 and adjacent to the cam plate 85, the gears 86 and 89 being driven intermittently by a discontinuous gear on the cam plate. The plates 85, 86, and 89 are arranged to be rotated by means of a speed selecting lever or crank 90 mounted on the side cover plate 82 of the housing enclosing the speed changer A, the operative connections being so arranged that the sliding gear couplets are shifted to effect the various gear combinations successively to provide the several changes in spindle speeds of which the speed changer is capable, as the crank 90 is turned through successive revolutions. To avoid accidental locking of the mechanism, the groove of cam plate 85 is so shaped as to prevent engagement of both the gear couplet 73 and the gear couplet 74 with gears of the idler cluster 75 at the same time. In order that all of the various gears might be shown distinctly, the shifting elements have been shown in neutral or out of mesh position in Fig. 5, but it is to be understood that the shifting mechanism does not provide for positioning the gears in the manner shown in this diagrammatic view.

Cooperating with the speed selecting lever 90 is a speed indicating dial 91, Fig. 1, provided with an outer row 92 and an inner row 93 of indicia, the dial being operatively connected to the plates 85, 86, and 89 in such manner that it is turned through one complete revolution while the plates are moving through one gear shifting cycle.

Figure 9:
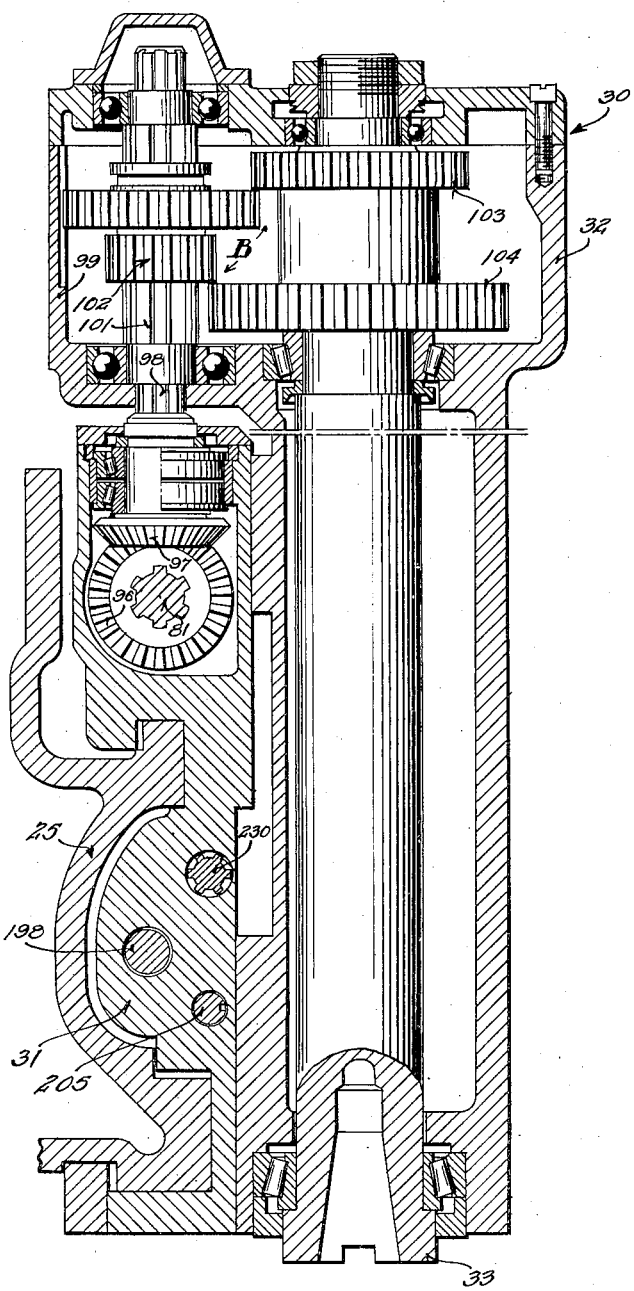
Fig. 9 is a view of the spindle supporting unit in vertical section on the plane represented by the line 9—9 in Fig. 1, showing the spindle drive mechanism and range changer.

From the speed changer A, power is transmitted through the splined shaft 81 to the spindle unit 30, that is slidably mounted on the rail 25, the other end of the shaft 81 being journaled in the end of the rail opposite from that occupied by the gear box 34. As shown in Fig. 9, the shaft 81 passes through the saddle 31 of the spindle unit, and has splined connection with a bevel pinion 96 journaled in the saddle. The pinion 96 meshes with a similar bevel pinion 97 on the lower end of a vertically disposed splined shaft 98 that extends upward from the saddle into a rearwardly projecting portion 99 of the spindle carrying head 32. Journaled within the portion 99 of the spindle head is an internally and externally splined sleeve 101 having sliding connection with the splined shaft 98 in manner to be driven thereby and to permit relative longitudinal movement therebetween when the spindle head 32 is moved vertically relative to the saddle 31. Slidably mounted upon the splined sleeve 101 is a range changing gear couplet 102, the gears of which are disposed to be engaged selectively with a relatively small gear 103 and a relatively large gear 104 secured on the upper end of the tool supporting spindle 33, the cooperating gears constituting a range changer B for driving the spindle 33 in either one of two speed ranges.

The range change couplet 102 may be shifted by means of a range changing lever 105, shown in Fig. 1, which may be moved from the position shown in full lines to the position shown in dotted lines to move the couplet 102 from the low speed range position to the high speed range position.

The particular gear shifting mechanism shown in Fig. 5 as constituting the speed changer A is capable of effecting sixteen different speeds of operation of the splined shaft 81, and since either of two ranges may be effected by adjusting the range changer B, the spindle 33 may be driven at any one of thirty-two speeds by appropriate settings of the speed changer A and the range changer B cooperatively. As previously explained in connection with Fig. 1, the speed indicating dial 91 of the speed changer A is provided with two circular rows of indicia, one row of indicia being used to indicate the speed when operating in one speed range and the other row being used when operating in the other speed range. As shown in Fig. 1, a stationary indicator 106 is disposed to cooperate with the outer row 92 of indicia, and a stationary indicator 107 is positioned to cooperate with the inner row 93, the indicators 106 and 107 being marked respectively S and F to correspond with the slow and fast positions of the range changing lever 105 whereby the machine operator may determine the spindle speed by noting the indicia adjacent to the indicator corresponding with the speed range established by the range changing lever 105.

This arrangement of speed changing gearing is found to be especially advantageous when the spindle 33 is operated at low speed, for under these conditions the driving torque of the spindle is ordinarily high and since the range changer B effects considerable speed reduction in the low range position, only the spindle and the gear 104 attached thereto are subjected to the high driving torque. By reason of the speed reduction in the range changer, both the vertical splined shaft 98 and the horizontal splined shaft 81 in the spindle unit 30 operate at speeds considerably higher than the spindle speed. Since both the speed changer A and the range changer B are carried by the rail 25, the transmission train from the spindle driving motor 45 to the speed changer A, including the main shaft 48 extending beneath the work table and the vertically disposed splined shaft 58, operate at a uniform relatively high speed, even though the spindle 33 may be turning at very slow speed. Consequently when the spindle 33 is operated under high torque and low speed conditions, the driving train from the motor 45 to the rail 25 continues to operate at high speed and to transmit relatively low torque, with the beneficial result that there is little deflection or twisting of the shafts in the driving train and consequently a smooth and steady driving torque is applied to the spindle, providing a powerful driving effect without vibration or chatter.

Power for moving the work supporting table 21 longitudinally of the bed 20 and for moving the spindle carrying head 32 vertically and horizontally upon the rail 25, is derived from a feed driving motor 115 mounted on the front side of the forward upright 22, as shown in Fig. 1. The shaft of the motor 115 is connected to a worm 116 which meshes with a worm wheel 117 as shown in Fig. 11, the worm wheel 117 being secured to a driving shaft 118 extending longitudinally of the bed 20 beneath the table 21. As shown in Fig. 11, the feed driving shaft 118 extends to the right and is connected at its right end to transmit power to a feed rate gear changing mechanism C a pinion 119 being provided on the end of the shaft 118 in meshing engagement with a gear wheel 120 on a primary shaft 121 of the rate changer. Slidably mounted on the primary shaft 121 are two gear couplets 122 and 123 respectively, which may be moved to mesh their gears with cooperating gears of an idler gear cluster 124. A secondary shaft 125 carries a slidably mounted gear couplet 126 adapted to be meshed selectively with and to be driven by gears of the idler cluster 124. The shaft 125 also carries fixed gears 127 and 128 with which the gears of a couplet 129 may mesh, the couplet 129 being mounted on a safety clutch 130 which is slidably splined on a tertiary shaft 131. The tertiary shaft 131 is provided on its left end with a small pinion 132 having meshing engagement with a gear 133 on the right end of a feed rate driving shaft 134, which is driven thereby at the speed established by the feed rate changer C.

The mechanism (not shown) for shifting the various sliding couplets of the rate changer C may be generally similar to the cam actuated shifting apparatus of the speed changing mechanism A mounted on the rail 25, a rate selecting lever 140 and a feed rate indicating dial 141 on the front of the machine (Fig. 2) being associated with the shifting mechanism for establishing the desired rate of feeding movement of the table or spindle, the arrangement being such that both the table 21 and the spindle carrying head 32 operate at the same feed rate.

The mechanism for moving the table 21 longitudinally of the bed 20 includes a non-rotatable table screw 145 that is fixed at its ends to the ends of the table and that cooperates with a rotatable table driving nut 146 journaled in the bed in manner capable of exerting longitudinal driving force on the screw 145. For rotating the nut 146 in direction to drive the table to the left, there is provided a gear train including a gear 147 fixed to the nut and meshing with a gear 148 rotatably mounted concentric with the feed driving shaft 134. For driving the table in the other direction—that is, to the right—a gear train is provided including a gear 149 fixed on the nut 146 and meshed with a reversing idler pinion 150 which in turn is meshed with a gear 151 also rotatably mounted concentric with the feed driving shaft 134.

For effecting a driving connection from the feed driving shaft 134 to the table driving gear 148 or to the table driving gear 151, there is provided on the shaft 134 between the gears a slidably keyed positive clutch sleeve 153 having at its ends positive jaw clutch teeth 154 and 155 respectively. The clutch teeth 154 of the clutch sleeve are disposed to be meshed with cooperating clutch teeth 156 on the end of a sleeve 157 which is rotatably mounted on the shaft 134 and that rotatably supports the drive gear 148. The sleeve 157 is connected by means of an over-running clutch 158 to the gear 148 in manner to drive it and its meshing gear 147 constituting the train for driving the table 21 in direction from right to left. In order to drive the table 21 in the reverse direction—that is, from left to right—the clutch sleeve 153 is shifted to the right to engage the teeth 155 at its other end with cooperating clutch teeth 160 on the end of a sleeve 161 rotatably mounted on the shaft 134 and rotatably supporting the gear 151 to which it is connected by means of an over-running clutch 162, the gear 151 acting through the reversing idler 150 and the gear 149 to turn the table driving nut 146 in the reverse direction.

For driving the table 21 in either direction at rapid traverse rate, two friction clutches are provided for selectively connecting one or the other of the table driving trains respectively directly to the support driving shaft 119 which operates at relatively high speed. As shown in Fig. 11, a friction clutch 164 is provided on the shaft 119 and arranged in manner to selectively couple a gear 166 thereto. A similar friction clutch 165 is arranged to selectively couple a gear 167 to the shaft, a shifting collar 168 being slidably mounted on the shaft between the clutches and operable to engage either the one or the other clutch. The gears 166 and 167 are meshed respectively with gears 169 and 170 which are fixed with the table driving gears 148 and 151 respectively, the over-running clutches 158 and 162 being operative to permit transition from feed rate to rapid traverse rate upon engagement of one or the other friction clutch without first disengaging the feed rate driving positive clutch 153.

Power for moving the spindle carrying head 32 relative to the table 21 at the feed rate determined by the rate changer C is transmitted from the left end of the feed rate driving shaft 134 through an over-running clutch 175 carrying a gear 176 which meshes with a gear 177 on the end of a shaft 178. The shaft 178 is provided with a bevel pinion 179 that meshes with a bevel pinion 180 on the end of a forwardly extending shaft 181. As shown in Fig. 4, the shaft 181 is provided on its forward end with a bevel pinion 182 meshing with a bevel pinion 183 on a vertically disposed stub shaft 184. The shaft 184 is provided with a gear 185 meshing with a similar gear 186 on the lower end of a vertically disposed splined shaft 187 extending upward from the base of the column 22 parallel with the spindle driving shaft 58, enclosing tubing 188 being provided to protect the shaft from foreign material and from injury.

As shown in Fig. 1, the shaft 187 extends upwardly into the gear box 34 on the forward end of the rail 25 in which it has splined connection with a bevel pinion 191, that is shown in Fig. 5, journaled in the box. The pinion 191 meshes with a similar bevel pinion 192 which is fixed with a spur gear 193 that drives a similar spur gear 194 on a shaft 195 also journaled in the gear box 34. The shaft 195 is provided with a gear 196 that meshes with a clutch gear 197 rotatably mounted on a cylindrical end portion of a threaded screw shaft 198, the threaded portion of which extends from the gear box longitudinally of the rail and is journaled at its other end in the opposite end of the rail, as shown in Fig. 1. A second gear 199 mounted on the shaft 195 meshes with a reversing pinion 200 which engages a second clutch gear 201 also rotatably mounted on the shaft 198 and disposed in opposition to the clutch gear 197, the gear 201 being rotated in direction opposite to that of the gear 197. Between the clutch gears 197 and 201, there is provided a shiftable clutch spool 202 which is slidably keyed to the threaded shaft 198, and which may be moved from the neutral position shown to couple either of the clutch gears to the shaft 198 to drive it in either direction selectively. As may be seen in Figs. 9 and 10, the threaded shaft 198 has threaded engagement with the saddle 31 of the spindle unit 30, the arrangement being such that the saddle may be moved lengthwise of the rail in either direction upon turning the threaded shaft 198 in the appropriate direction.

For controlling the movements of the spindle carrying head 32 by the power driven feed mechanism, there is provided a trip rod 205 which extends longitudinally of the rail 25 and is mounted therein in manner to permit of both longitudinal and rotational movement. To control longitudinal movement of the saddle 31 along the rail 25, the control rod 205 is provided with stop collars 206 disposed to be engaged by the saddle and to effect longitudinal movement of the rod 205. As shown in Fig. 7, the rod 205 enters the gear box 34 and is provided therein with spaced collars 207 that engage one arm of a bell crank 208. The other arm of the bell crank 208 is geared to an arm of a similar bell crank 209 which engages with its other arm a shifting sleeve 210 carrying a shifting fork 211 that engages the clutch spool 202, the arrangement being such that when the rod 205 is moved longitudinally by the saddle 31 engaging a stop collar 206, the linkage effects movement of the clutch spool 202 to neutral position, thereby disengaging the shaft 198 from the driving clutch gear.

For engaging the clutch spool 202 with one of the clutch gears to move the saddle in selected direction, there is provided on the side of the gear box 34 an actuating lever 215 connected to turn a shaft 216, as shown in Fig. 1, the shaft 216 being provided with a slotted collar 217, Figs. 7 and 8, that cooperates with a pin 218 on an arm of the shifting sleeve 210 in manner to effect shifting movement of the shifting fork 211 when the lever 215 is actuated. As shown in Fig. 7, the collar 217 is provided with detent notches 220 that cooperate with a spring-pressed detent 221 for positioning the clutch spool shifting mechanism in neutral position or in either of its positions for moving the saddle 31 in either direction along the rail. To insure that the saddle will not be moved by power unintentionally, the directional control lever 215 is provided with a locking pin 222 for locking the lever in neutral position.

For moving the spindle unit 30 along the rail manually, the forward end of the screw shaft 198 is provided with a bevel pinion 225 (Fig. 5) within the gear box 34 which meshes with a similar bevel pinion on a shaft 226, extending through the cover of the gear box and presenting a splined end for receiving an operating crank, not shown. As shown in Fig. 1, the splined end of the shaft 226 is disposed adjacent to the control lever 215 in such position that an interference ring 227 on the lever 215 prevents engagement of the hand crank when the power driving mechanism is engaged. Likewise, the interference ring 227 prevents movement of the lever 215 when the hand crank is engaged with the shaft 226, thus making it impossible to engage the power feed with the hand crank attached, which would otherwise result in spinning of the crank with danger of injury to the operator.

Figure 10:
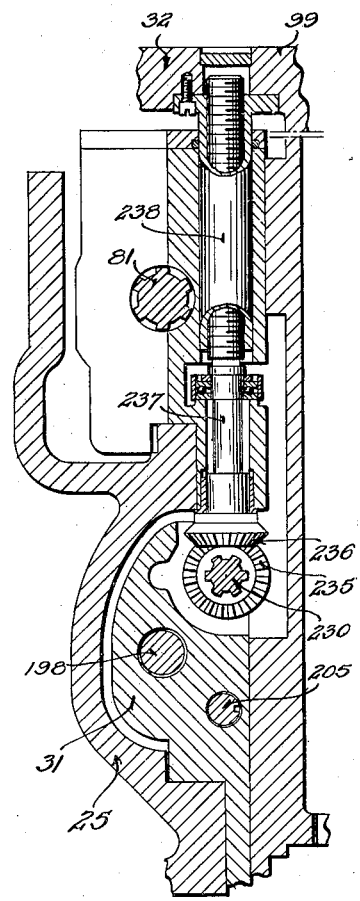
Fig. 10 is a fragmentary view generally similar to Fig. 9 but on another plane, showing the spindle head elevating mechanism.

The mechanism for moving the spindle carrying head 32 vertically relative to the saddle 31 includes a splined spindle elevating shaft 230 (Figs. 1 and 5) disposed longitudinally of the rail 25, parallel with the threaded shaft 198, and having rotatably mounted on its forward end within the gear box 34 a pair of opposing clutch gears 231 and 232 which mesh respectively with the clutch gears 197 and 201, which are driven in opposite directions, as previously explained. Between the clutch gears 231 and 232 is a clutch spool 233 that is slidably keyed to the shaft 230 in manner to be moved to couple either of the gears to the shaft for driving it in either direction selectively. As shown in Fig. 10, the shaft 230 passes through the saddle 31 and has splined connection therein with a bevel pinion 235 which is journaled in the saddle and which has meshing engagement with a bevel pinion 236 on the lower end of an elevating screw shaft 237 extending upward from the saddle. The upper portion of the shaft 237 has threaded engagement with an internally threaded sleeve 238 that depends from the rearwardly projecting portion 99 of the spindle carrying head 32, the arrangement being such that when the shaft 237 is rotated the head 32 is moved vertically relative to the saddle 31.

For limiting the vertical movement of the head 32 by power, tripping mechanism is provided as shown in Fig. 1, including trip dogs 239 adjustably mounted on the head and cooperating with a tripping arm 239' on the saddle 31, the arm being connected to turn the trip rod 205 when the head arrives at predetermined position. As shown in Fig. 6, the trip rod 205 is provided within the gear box 34 with a gear segment 240 engaging rack teeth on a vertically movable trip rod 241 having a slot and pin connection with one arm of a bell crank lever 242. The other arm of the bell crank 242 carries a shifting yoke 243 that engages the clutch spool 233, the arrangement being such that when the trip rod 205 is turned by the trip mechanism, the connecting linkage moves the clutch spool 233 to neutral position, thereby disconnecting the power drive from the spindle elevating shaft 230.

For engaging the clutch spool 233 to effect power movement of the spindle head 32 in selected direction, there is provided a direction selecting lever 245, shown in Fig. 1, mounted on the side of the gear box 34, and carried on the outer end of a shaft 246 which is provided on its inner end (Fig. 7) with an arm 247 having a slot and pin engagement with the end of an arm 248 that is connected to turn the clutch shifting bell crank 242. The arm 247 is provided with detent notches 249 that cooperate with a spring pressed detent 250 to retain the lever 245 and the clutch spool 233 either in the neutral position or in one or the other operating position. To prevent movement of the spindle head 32 vertically by power unintentionally, the lever 245 is provided with a locking pin 252 by means of which it may be locked in neutral position.

For moving the spindle head 32 vertically by hand, there is provided on the front of the gear box 34 a handwheel 255 by means of which a shaft 256 may be turned, the shaft having gear teeth at its inner end constituting a pinion 257 which meshes with a gear 258 on the forward end of the spindle elevating shaft 230. To prevent the handwheel 255 from being rotated by power when the elevating clutch spool 233 is engaged with a power driving clutch gear, the handwheel is operatively connected to the shaft 256 by means of a positive clutch 260 that may be moved to disengaged position by a rod 261 extending longitudinally through the shaft 256. At its inner end the rod 261 is engaged by the end of a lever 262 pivotally mounted in the gear box and provided with a detent arm 263, Fig. 7, that cooperates with a cam plate 264 carried by the vertically disposed control rod 241, the arrangement being such that when the clutch spool 233 is in neutral position, the detent arm 263 engages a notch in the cam plate 264 and permits the clutch 260 to be engaged for coupling the handwheel 255 to the shaft 256. When the clutch sleeve 233 is moved in either direction into engagement with a driving gear, the cam plate 264 is moved to force the detent 263 out of the notch against the resistance of a spring 265, thereby turning the arm 262 and moving the rod 261 to the left as seen in Fig. 5, to disengage the clutch 260, the spring functioning to re-engage the clutch 260 when the clutch sleeve 233 is returned to neutral position. The spindle head 32 may be locked in vertical position relative to the saddle 31 by means of mechanism including a clamping lever 266.

For effecting movement of the spindle 33 at rapid traverse rate along the path and in the direction established by the directional control levers 215 and 245, there is provided a rapid traverse friction clutch 270, mounted directly on the feed motor driven shaft 118, as shown in Fig. 11, and operative to selectively couple a gear 271 to the shaft 118. The gear 271 meshes with a gear 272 mounted on the over-running clutch 175, the arrangement being such that when the friction clutch 270 is engaged, the gear 272 and the gear 176 on the over-running clutch 175 are rotated at rapid traverse rate, with the clutch 175 over-running the feed driving shaft 134.

Figure 2:
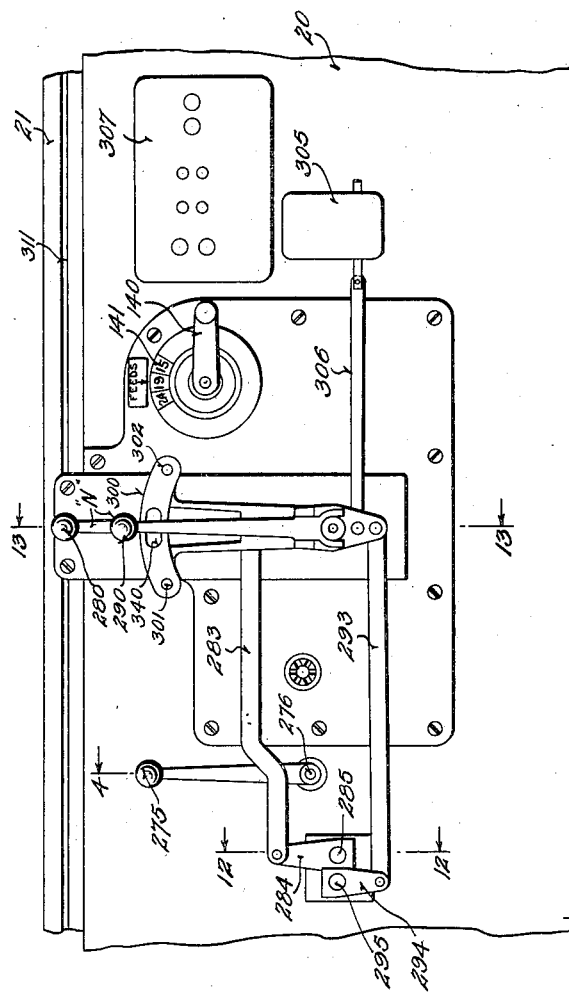
Fig. 2 is a fragmentary view in front elevation of the part of the machine bed carrying the levers for controlling feeding movements of the machine parts.

For actuating the friction clutch 270, there is provided a clutch shifting sleeve 273 which is slidably mounted on the shaft 118 and that may be moved to engage or disengage the clutch by means of a shifting fork 274 actuated by a spindle rapid traverse lever 275, as shown in Fig. 4, the lever being mounted on the front of the machine in position accessible to the operator, as shown in Fig. 2. The rapid traverse lever 275 is carried on the end of a shaft 276 journaled in the bed 20 and provided at its inner end with an arm 277 which engages the shifting fork 274 for moving it and the clutch sleeve 273 longitudinally of the shaft 118. By reason of the independent rapid traverse friction clutch 270, the spindle carrying head 32 may be moved at either feed rate or rapid traverse rate along the path and in the direction determined by the control levers 215 and 245 independently of the work table 21 and regardless of whether the table is stationary or is moving in either direction at either feed rate or rapid traverse rate. Likewise, the table 21 may be operated at either feed rate or rapid traverse rate in either direction by suitably shifting the clutch sleeve 153 and the shifting collar 168, independently of movement of the spindle head 32. However, the feed rate at which either the spindle head 32 or the table 21 may be moved is determined by the feed rate changing mechanism C which establishes a common feeding rate for both movable elements, the rate being indicated by the dial 141 on the front of the bed 20.

For controlling movement of the table 21 at feed rate, there is provided on the front of the machine a feed control lever 280 that is connected to turn a control shaft 281 extending transversely through the bed and provided at the rear of the machine with a rear feed control lever 282, as shown in Fig. 13. The feed lever 280 has pivotally connected to it one end of a control link 283 which connects it with an arm 284 on a clutch shifting shaft 285 as shown in Fig. 2. As shown in Fig. 12, the shifting shaft 285 is provided at its inner end with a shifting yoke 286 that engages the clutch sleeve 153 on the feed rate shaft 134, the connections being such that by moving the lever 280 from side to side, the clutch sleeve 153 may be moved into engagement with the clutch gear 148 or the clutch gear 151 to effect movement of the table in either direction at feed rate, the table moving in the direction in which the lever is moved.

For controlling the movement of the table at rapid traverse rate, there is provided in front of the feed lever 280 a rapid traverse control lever 290 connected to turn a control shaft 291 disposed just below and parallel with the control shaft 281. The shaft 291 also extends transversely through the bed and is provided at its other end with a rear control lever 292. The control lever 290 is pivotally connected to one end of a link 293 which engages at its other end an arm 294 on a shifting shaft 295 disposed adjacent to and parallel with the shifting shaft 285. As shown in Fig. 12, the shifting shaft 295 is provided at its inner end with a shifting yoke 296 which engages the rapid traverse clutch shifting collar 168 on the shaft 118. By movement of the lever 290 from side to side, the shifting collar 168 is moved to engage either the friction clutch 164 or the friction clutch 165 to effect movement of the table 21, in the direction of movement of the lever, at rapid traverse rate, the over-running clutches 158 and 162 in the feed drive mechanism permitting transition from feed rate to rapid traverse rate in the same direction without disengaging the feed rate positive clutch spool 153.

To prevent accidental engagement of a rapid traverse friction clutch while the positive clutch for effecting feed rate movement in the opposite direction is engaged, the feed rate control lever 280 has associated with it a segmental interlocking member 300. As shown in Figs. 13 and 14, the interlocking segment 300 is connected to the control shaft 281 to turn with it and the lever 280, and it is provided at its ends with interference pins 301 and 302 respectively. Referring to Fig. 14, when the feed lever 280 is moved from the neutral position N to feed position F, indicated by the dotted circle, to effect feeding movement of the table 21 to the right, the segment 300 is likewise moved to the right to the dotted line position also indicated by the letter F. In this position, the interference pin 301 is brought near to the neutral position of the levers, and should the rapid traverse control lever 290 be moved to the left to engage the friction clutch 164 for moving the table to the left at rapid traverse rate, the lever 290 would first engage the pin 301. Further movement of the lever would then turn the segment 300 to the left, thereby turning the control shaft 281 and disengaging the positive clutch for effecting feeding movement of the table to the right. By this arrangement, the positive clutch is disengaged before the friction clutch is engaged, thereby preventing damage to the mechanism which might otherwise result should the rapid traverse clutch for movement in one direction be engaged while the feed clutch for movement in the other direction is engaged.

As more fully set forth in my previously mentioned Patent No. 2,081,288, the electrical controls for the spindle driving motor 45 and the feed driving motor 115 are so interlocked that the feed motor does not normally operate unless the spindle driving motor is operating, to avoid the possibility of feeding a workpiece against a stationary cutter. However, as it is desirable to provide for movement of the table 21 or the spindle head 32 at rapid traverse rate while the spindle driving motor 45 is not operating, as when setting up a workpiece, there is provided an auxiliary switch 305 indicated in Fig. 2, which is connected by means of a link 306 to be operated by the rapid traverse lever 290, the arrangement being such that when the lever 290 is moved to rapid traverse position in either direction, the switch 305 is closed to energize the feed driving motor 115 independently of the spindle driving motor. A control panel 307 on the front of the machine presents push buttons for starting and stopping the various motors.

Figure 3:
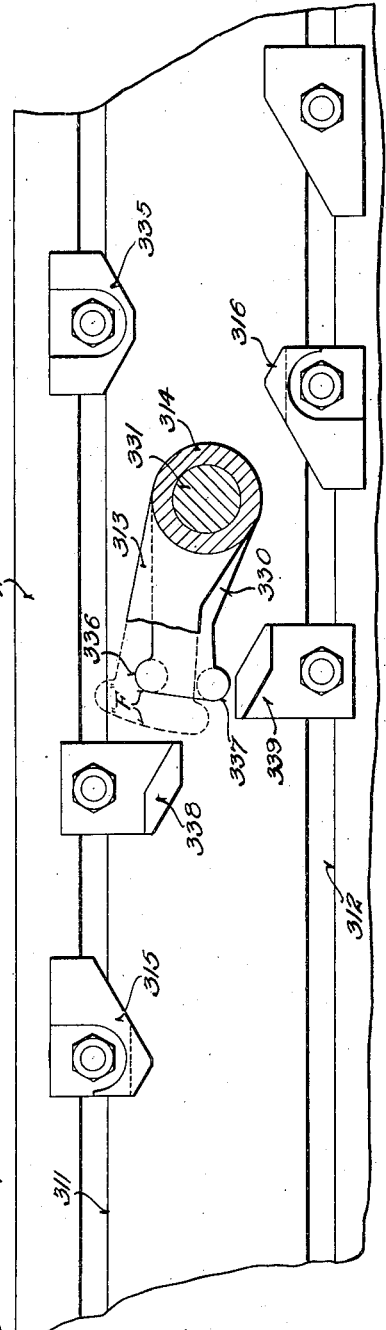
Fig. 3 is a fragmentary frontal view, partly in section on the plane represented by the lines 3—3 in Fig. 13, showing the tripping arms and the cooperating trip dogs on the front face of the machine table.

To provide for automatically controlling movement of the work table 21, the forward face of the table is provided with two T slots 311 and 312, as shown in Figs. 3 and 13, for receiving trip dogs, the upper slot carrying dogs for functioning when the table is moving from left to right and the lower slot carrying dogs which are effective during movement of the table from right to left. For stopping the table automatically, there is provided a trip arm 313 carried on the inner end of a sleeve or hollow shaft 314 that is journaled horizontally in the upper edge of the bed 20 adjacent to the forward face of the table. As shown in Fig. 13, the trip arm 313 is adapted to be engaged by a stop dog 315 in the upper T slot 311 or by a stop dog 316 in the lower T slot 312, either of which functions to move the arm to horizontal or neutral position for stopping feeding movement of the table.

For actuating the feed clutch shifting mechanism, the forward end of the sleeve 314 is provided with an arm 318, as shown in Figs. 15 and 16, to which one end of a vertically disposed link 319 is pivotally connected, the other end of the link being pivoted to an arm 320 fixed on the control shaft 281. The linkage connecting the sleeve 314 to the control shaft 281 is so arranged that when the trip arm 313 is in horizontal position, the feed lever 280 is in vertical or neutral position indicated by the letter N, and when the feed lever 280 is moved to the right to position F for effecting feeding movement of the table to the right, the arm 313 is moved upward to position F, shown dotted in Fig. 17, into the path of movement of the stop dog 315. At a predetermined position of the table in its course of movement, the stop dog 315 engages the arm 313 in manner to move it back to position N, thereby disengaging the feed driving clutch sleeve 153 and stopping the table. For retaining the feed lever 280 and the trip arm 313 in neutral position or in either feeding position, the arm 320 on the control shaft 281 is provided with detent notches 322 which are engaged by a spring pressed detent 323, as shown in Fig. 15.

To provide for starting the table in the same direction after it has been stopped by a stop dog, the sleeve 314 is slidably mounted in manner to permit withdrawing the tripping arm 313 from engagement with the stop dog, a helical spring 325 being positioned as shown in Fig. 13, to normally hold the sleeve in its forward or active position. For effecting movement of the sleeve 314, the feed lever 280 is pivotally mounted on a pin 326 which connects it to the control shaft 281, in manner to permit movement of the lever 280 toward or from the machine in the plane of the shaft 281. When the lever is moved forward away from the machine, the lower end thereof engages a sliding key 327 fitted in the shaft 281, as shown in Fig. 15, and that engages at its inner end with the lower end of a lever 328 that is pivoted near its mid-portion on the bed 20 and that engages with its upper end a shoulder formed by the arm 318 on the sleeve 314, as shown in Figs. 13 and 16, the operation being such that forward movement of the lever 280 moves the sleeve 314 forward against the resistance of the spring 325 and withdraws the trip arm 313 from engagement with the stop dog. The lever 280 may then be moved to re-engage the feed clutch, the arm 313 passing in front of the trip dog.

A second trip arm 330 disposed adjacent to the trip arm 313 is provided for automatically changing the rate of movement of the table from feed rate to rapid traverse rate or vice versa. As shown in Fig. 13, the arm 330 is carried on a shaft 331 journaled in and extending through the hollow sleeve 314. At its forward end, the shaft 331 is provided with an arm 332 pivotally connected to the upper end of a vertical link 333 that is pivotally connected at its lower end to an arm 334 on the rapid traverse clutch control shaft 291, the arrangement being such that when the rapid traverse control lever 290 is in vertical or neutral position N, the trip arm 330 is in horizontal position, likewise designated N and shown in full lines in Fig. 17. When the rapid traverse lever 290 is moved to rapid traverse position R, indicated by the dotted circle in Fig. 14, the rapid traverse trip arm 330 is moved to its uppermost position R, shown in dot-dash lines in Fig. 17.

To change the rate of table movement from rapid traverse rate to feed rate, a feed rate dog 335 may be provided in the T slot 311 to engage the arm 330 and force it downward from its raised position R, thereby turning the control shaft 291 and disengaging the rapid traverse friction clutch. To provide for automatically changing the rate of table movement from feed rate to rapid traverse rate, the tripping arm 330 is provided with vertically spaced inwardly projecting lugs 336 and 337, as shown in Figs. 13 and 17, for engagement respectively by rapid traverse tripping dogs 338 and 339, shown in Fig. 3. The rapid traverse dog 338 is adapted to act upon the trip arm 330 when the table is moving from left to right and the dog 339 is adapted to act upon the trip arm when the table is moving from right to left.

In order that the proper rapid traverse dog may act upon the rapid traverse trip arm 330, means are provided for turning the arm to move it out of the path of action of one dog and into the path of action of the other dog. For this purpose, the interlocking segment 300 associated with the feed lever 280 is provided with a slot 340 that receives a pin 341 on the rapid traverse lever 290, as shown in Figs. 13 and 14. When the feed lever 280 is moved to actuate the table at feed rate, for example: to the position F indicated in Fig. 14, the end of the slot 340 in the segment 300 engages the pin 341 on the rapid traverse lever 280 and moves it a short distance to the dotted circle position F, there being sufficient lost motion in the linkage to permit this movement without engaging the rapid traverse clutch. With the rapid traverse lever 290 in position F, the rapid traverse trip arm 330 is turned to position F as shown in Figs. 3 and 17. As shown in Fig. 3, the upper lug 336 of the arm 330 is thereby moved into position to be engaged and lifted by the upper rapid traverse dog 338 as the table moves from left to right, and at the same time the lower lug 337 is moved upward out of the path of the lower dog 339. When the table is being operated at feed rate in the direction from right to left, the levers 280 and 290 are moved to the left and the tripping arm 330 is moved downward to position the lug 337 for engagement by the dog 339 and to move the lug 336 out of the path of movement of the dog 338.

When it is desired to operate the table at rapid traverse rate without first engaging the feed rate drive, the pin 341 of the lever 290 may be disengaged from the slot 340 in the interlocking segment 300 by pivoting the lever 290 forward about a pivot pin 343 which connects it to the control shaft 291, a spring 344 being provided to normally retain the lever in its inner position with the pin in engagement with the slot. However, the forward movement of the lever 290 is so limited in extent that the lever cannot be moved past the pins 301 and 302 at the ends of the interlocking segment 300, the pins serving at all times to prevent engagement of a rapid traverse clutch while the feed clutch for movement in the opposite direction is engaged.

By reason of the fact that the feeding movement of table 21 is effected by a clutch of the positive jaw type, it is possible to stop the table by means of a stop dog at an accurately predetermined position, since the clutch teeth disengage instantaneously and completely upon movement of the tripping arm 313 to a predetermined position. Likewise, it is especially advantageous to utilize control mechanism employing the two friction clutches 164 and 165 for effecting rapid traverse movement of the table, since either clutch may be engaged by the rapid traverse lever 290 to move the table selectively at rapid traverse rate in either direction without the necessity of shifting gears or positive clutches to effect reversal and without shock or excessive strains upon the transmission mechanism, the clutches being engaged smoothly to quickly effect movement in either direction by simply moving the lever 290 to the rght or to the left, as may be desired.

From the foregoing description of the automatic tripping mechanism, it is apparent that the rate of movement of the table 21 may be changed or the table stopped by means actuated directly by the moving table. Inasmuch as no further movement of the shifting mechanism can be effected directly by the table after the clutches are disengaged and the table stops, it is necessary, in order to effect automatic reversal of the direction of table movement, to provide auxiliary power means for moving the clutches through the neutral position to a position causing table movement in the opposite direction. For this purpose, the machine may be equipped with an auxiliary power reversing mechanism of the type shown in Figs. 18 to 22, utilizing fluid pressure for shifting the clutches.

Referring particularly to Figs. 18 and 19, the power shifting mechanism there shown is adapted to be mounted on the front of the machine bed 20, in the region of the control levers. The apparatus comprises essentially a hydraulic cylinder 350 provided with a cooperating piston 351 connected to effect movement of the positive clutch sleeve 153 for controling feeding movement of the table, and another similar cylinder 352 provided with a cooperating piston 353 that is arranged to actuate the rapid traverse clutch controlling collar 168, a control valve 354 being provided for controlling the admission of fluid pressure to the cylinders.

As shown in Fig. 18, the feed controlling piston 351 in the cylinder 350 is carried on a piston rod 356, the end of which is provided with a yoke 357 that engages a sliding block 358 carried by the shifting link 283, the arrangement being such that movement of the piston within the cylinder shifts the link 283 to move the clutch sleeve 153 in the same manner that shifting of the clutch sleeve is effected by the feed direction control lever 280. The piston 353 in the cylinder 352 is likewise carried on a piston rod 359 provided with a yoke 360 which engages a sliding block 361 on the shifting link 293 in manner to actuate the rapid traverse clutch shifting collar 168 in the way in which it is actuated by the rapid traverse control lever 290.

Shifting of the control valve 354 to effect power shifting of the feed and rapid traverse clutches is accomplished by means of reversing trip rods 365 and 366 respectively, which are positioned to be engaged by reversing trip dogs such as the dog 367 shown mounted in the lower T slot 312 of the table 21 in Fig. 19. As shown in Fig. 18, the trip rods 365 and 366 act upon the respective ends of a pivotally mounted lever 368, the arrangement being such that the lever is rocked in one direction or the other upon downward movement of the respective trip rods. The pivoted lever 368 is provided with a depending arm 369 which engages a cross head 370 connected with a plunger 371 of the valve 365 for moving the plunger longitudinally within a cooperating valve casing 372.

Referring to the control circuit diagram shown in Fig. 20, fluid pressure for operating the hydraulic reversing mechanism is derived from a pressure pump 375 which may be the pump for providing lubricating oil under pressure to the moving parts of the machine, and which is driven by means of a downward extension of the vertically disposed splined shaft 58, as shown in Fig. 4. With the valve plunger 371 in the central or neutral position, as shown in Fig. 20, oil under pressure from the pump 375 flows through a conduit 376 to a valve port 377 in the valve casing 372 and thence through a conduit 378 to a valve port 379, which is in communication through a groove 380 in the valve plunger with a port 381 communicating with a low pressure relief valve 382. From the relief valve 382, the oil flows through a conduit 383 to the lubricating system of the machine or to any other outlet providing escape at low pressure.

When one of the reversing trip rods, for instance: the trip rod 366, is depressed by a cooperating reversing dog, the valve plunger 371 is moved to the left to the position shown in Fig. 21. With the valve in this position, the valve port 381 leading to the low pressure relief valve 382 is closed, thus forcing the oil under pressure to escape from the port 379 through a conduit 384 to a high pressure relief valve 385 which permits escape of the oil only after a predetermined high pressure has been established in the system. As soon as the valve plunger 371 has been moved to the left by the reversing dog a sufficient distance to register a groove 386 therein with the pressure port 377 in the casing 372, the oil under pressure flows longitudinally of the valve plunger through a conduit 387 therein, to a cylinder 388 formed in the right end of the casing, exerting pressure therein on the end of the valve plunger to force it quickly to its extreme left position.

Fluid pressure from the port 377 then passes through a groove 390 in the valve plunger to a port 391 in the casing which communicates by means of a conduit 392 with the left end of the cylinder 350. Pressure in the left end of the cylinder 350 causes the piston 351 to be moved to the right, thereby actuating the shifting mechanism in manner to engage the clutch sleeve 153 for driving the table at feed rate to the right. Fluid in the right end of the cylinder 350 escapes through a conduit 393 communicating with a valve port 394 that connects through a groove 395 in the plunger with a port 396 which is open to the atmosphere.

When the piston 351 arrives at the right end of the cylinder 350, it uncovers a port 398 at the middle of the cylinder through which the fluid enters a conduit 399 leading to a rate selecting valve 400, the fluid passing through a groove 401 of the valve into a conduit 402 leading to a port 403 in the valve casing 372. The port 403 communicates through a groove 404 in the valve plunger with a port 405 connected by a conduit 406 to the right end of the cylinder 352. Pressure in the right end of the cylinder 352 forces the piston 353 therein to the left, turning the shifting shaft 295 clockwise and causing the clutch shifting collar 168 to engage the rapid traverse clutch for moving the table at rapid traverse rate to the right. Fluid in the left end of the cylinder 352 escapes through a conduit 407 to a valve port 408 that communicates through a groove 409 in the valve plunger to a port 410 that is open to the atmosphere.

When the piston 353 arrives at the left end of the cylinder 352, it uncovers a port 411 in the middle of the cylinder through which the fluid enters a conduit 412 leading to an equalizing valve 413 that is normally held closed by a spring 414. Pressure in the conduit 412 forces the equalizing valve 413 to open position and establishes communication from the cylinder 388 at the right end of the valve casing 372 through a conduit 415 to a conduit 416 leading to a cylinder 417 at the left end of the valve casing. This connection equalizes the pressures on the ends of the valve plunger 371, permitting it to return to neutral position under the influence of springs 418 associated with the reversing trip rods and functioning to urge the pivoted arm 368 to horizontal or neutral position.

Upon the valve plunger 371 returning to neutral position, the conduit 399, which is connected to a port 419 in the valve casing, is placed in communication with the atmosphere by a valve groove 420 which communicates with a port 421 open to the atmosphere. This connection permits the oil under pressure in the cylinders 350 and 352 and in the connecting conduits to escape to atmosphere. Movement of the plunger 371 to neutral position also re-establishes connection from the pump 375 to the low pressure relief valve 382 through the valve groove 380, as previously explained, thereby reducing the pressure in the system to that required for the lubricating system.

When the other reversing rod 365 is depressed by a cooperating reversing dog, to effect reversal of the table at the end of a stroke to the right, the valve plunger 371 is moved to the right to the position shown in Fig. 22. With the valve in this position, the groove 380 is moved out of register with the pressure port 379, thereby closing the passageway to the low pressure relief valve 382 and causing the operating pressure to build up to that determined by the high pressure relief valve 385, as previously explained. Movement of the valve plunger to the right is completed by hydraulic pressure as soon as a valve groove 425 communicates with the pressure port 377, whereupon pressure passes longitudinally through the valve plunger by way of a conduit 426 therein to the cylinder 417 at the left end of the valve casing to force the plunger to its extreme right position. This brings the groove 395 of the plunger into communication with the pressure port 377, permitting oil under pressure to flow through the port 394 and the conduit 393 into the right end of the cylinder 350 to move the piston 351 to the left, thereby engaging the positive clutch sleeve 153 for moving the table to the left at feed rate. Oil in the left end of the cylinder 350 then escapes through the conduit 392, the port 391, and the valve groove 390, into the port 421 which is open to the atmosphere.

The oil under pressure from the cylinder 350 then flows through the port 398, the conduit 399, the groove 401 of the rate selecting valve 400, and the conduit 402, to the valve port 403 of the valve casing. The valve groove 409, in the right position of the plunger 371, then establishes communication from the port 403 to the port 408 which communicates through the conduit 407 with the left end of the cylinder 352, the pressure causing the piston 353 to be moved to the right, thereby moving the clutch shifting collar 168 to engage the rapid traverse friction clutch for moving the table to the left at rapid traverse rate. Oil in the right end of the cylinder 352 is forced out through the conduit 406, the port 405, and through the valve groove 404 to the valve port 396 which is open to atmosphere.

Oil under pressure in the left end of the cylinder 352 then escapes through the port 411 at the middle thereof into the conduit 412 and acts upon the equalizing valve 413 to open it and establish communication from the cylinder 417 at the left end of the valve casing through the conduits 416 and 415 to the cylinder 388 at the other end of the casing, thereby equalizing the pressures on the ends of the valve plunger and permitting it to return to neutral position under the influence of the springs 418. As previously explained, the pressure in the cylinders 350 and 352 is then permitted to escape through the conduit 399, the valve port 419, and valve groove 420 into the valve port 421, which is open to the atmosphere. Further, both ends of both cylinders are opened to the atmosphere through the ports 410, 396, and 421, as appears in Fig. 20. This releases both the piston 351 and the piston 353 from pressure and permits movement of the control linkage by the manually actuated levers or by the tripping arms.

If it is desired to reverse the table 21 at feed rate instead of at rapid traverse rate, the conduit leading from the feed rate reversing cylinder 350 to the rapid traverse rate reversing cylinder 352 may be interrupted by moving the rate selecting valve 400 to the left, as seen in Fig. 20, to move the groove 401 thereof out of communication with the conduits 399 and 402 and to move a groove 430 thereof into position to establish communication from the conduit 399 directly to the conduit 412 which connects with the equalizing valve 413. With the rate selecting valve 400 in the feed position, the pressure fluid from the cylinder 350 acts directly upon the equalizing valve 413 to equalize the valve plunger 371 and return it to neutral position without exerting pressure upon the rapid traverse reversing piston 353 in the cylinder 352. Should the table be operating at rapid traverse rate when one of the reversing trip rods is depressed and the rate selecting valve 400 is set for reversing at feed rate, the movement of the piston 351 and the link 283 in direction to effect engagement of the positive feed clutch will turn the feed control lever 280 and the interlocking segment 300 in manner to engage one of the interference pins thereon with the rapid traverse control lever 290, thus moving the lever and the rapid traverse clutch shifting collar 168 to neutral position before engaging the feed clutch lever 153 for effecting feeding movement of the table in the opposite direction.

From the foregoing description and explanation of the operation of the milling machine set forth herein as a preferred embodiment of this invention, it is evident that the invention has provided an improved machine tool transmission and control mechanism for actuating and controlling the various movable elements of a machine tool such as a milling machine of the bridge type.

Although only one specific embodiment of the invention has been shown and described in detail to fully disclose an operative embodiment thereof, it will be apparent to others skilled in the art to which this invention relates that various modifications may be devised by skilled mechanics in practicing the principles herein set forth without departing from the spirit and scope of the invention, as defined in the subjoined claims.

I claim as my invention:

1. In a machine tool having a plurality of movable supports, the combination with a source of power and a variable speed device disposed to transmit power from said source for moving said supports at a selected feed rate, of means including an over-running clutch and a disconnecting clutch associated with each of said supports and disposed to connect any of said supports selectively to said variable speed device, and means including a disconnecting clutch associated with each of said supports disposed to connect any of said supports directly to said source of power for moving said supports selectively at rapid traverse rate, the arrangement being such that the movement of any of said supports may be changed from feed rate to rapid traverse rate without disconnecting the feed rate clutch associated with said support and without changing the rate of movement of any other support.

2. In a machine tool having a frame and a plurality of supporting members movably mounted on said frame, the combination with a source of power carried by said frame and a feed rate changing mechanism driven by said source of power, of a transmission train for driving the first of said supporting members including two over-running clutches connected respectively to drive said member in forward and in reverse direction and disconnecting clutch mechanism for selectively coupling one or the other of said over-running clutches to said rate changing mechanism in manner to be driven thereby; a transmission train for driving the second of said supporting members including an over-running clutch coupled to and driven by said rate changer and disconnecting clutch mechanism disposed to selectively couple said over-running clutch to said movable member in manner to drive it in either direction along either of two paths of movement, two friction clutches disposed to connect said first supporting member directly to said source of power for driving said member in forward and reverse direction respectively at rapid traverse rate, and a friction clutch disposed to connect said disconnecting clutch mechanism associated with said second supporting member directly to said source of power for driving said member at rapid traverse rate along the path and in the direction established by said disconnecting clutch mechanism.

3. In a milling machine of the rail type including a frame, a work supporting table movably mounted on said frame, uprights at the sides of said frame, a rail carried by said uprights, a spindle support movably mounted on said rail, and a tool supporting spindle rotatably carried by said spindle support; the combination with a source of power mounted in said frame and a variable speed device connected to be driven by said source of power, of a shaft connected to be driven by said variable speed device at a selected feed rate, two over-running clutches rotatably mounted on said feed rate shaft, trains connecting said over-running clutches respectively to drive said table in opposite directions, a clutch device disposed to connect either of said clutches to said shaft to drive said work support in either direction at the selected feed rate, clutch mechanism arranged to connect either of said trains directly to said source of power to drive said work supporting table selectively in either direction at rapid traverse rate, a third over-running clutch directly connected to said feed rate shaft, a train including directional selecting means connected to transmit power from said third over-running clutch to said spindle support to move it at the selected feed rate in selected direction, and a clutch mechanism disposed to connect said spindle support moving train directly to said source of power to drive said spindle support selectively at rapid traverse rate in the direction determined by said directional selecting means, the over-running clutches serving to permit transition from feed rate to rapid traverse rate without disengaging the feed rate driving clutches.

4. In a machine tool rate changing and reversing mechanism, the combination with a driven element, of two trains each including an over-running clutch, said trains being connected to drive said element in opposite directions respectively, means including positive clutches arranged to be selectively coupled to the over-running clutch of the one or the other of said trains for driving said clutch and said element at slow rate, and means including friction clutches arranged to be selectively coupled to the one or the other of said trains for driving said element at fast rate, said over-running clutches permitting operation of either train at fast rate whether or not the positive clutch associated with that train is engaged.

5. In a machine tool rate changing and reversing mechanism, the combination with a driven element, of two trains each including an over-running clutch, said trains being connected to drive said element in opposite directions respectively, means including positive clutches arranged to be selectively coupled to the over-running clutch of the one or the other of said trains for driving said element at slow rate, means including friction clutches arranged to be selectively coupled to the one or the other of said trains for driving said element at fast rate, said over-running clutches permitting operation of either train at fast rate whether or not the positive clutch associated with that train is engaged, and means for controlling said clutches including an interlocking device arranged to prevent engagement of said clutches with both of said trains simultaneously.

6. In a rate changing and reversing mechanism for driving a movable element of a machine tool, the combination with a member driven at low speed and a member driven at high speed, of two over-running clutches associated with said low speed member, transmission trains operatively connecting each of said over-running clutches to a movable element in manner to drive it in the one or the other direction respectively, clutch mechanism disposed to couple either of said over-running clutches to said low speed member for driving said movable element at low speed in selected direction, and clutch mechanism disposed to couple either of said transmission trains to said high speed member for driving said movable element at high speed in selected direction, said over-running clutches permitting transition from low speed rate to high speed rate without disengaging said low speed clutch mechanism.

7. In a machine tool having a movable work support and a movable tool support, the combination with a motor for driving said supports, of a speed changing mechanism operative to transmit power from said motor to said supports at a selected one of a plurality of feed rates, selective means to couple said speed changing mechanism to drive said work support and to drive said tool support at selected feed rate, and independent means arranged to selectively couple said supports to said motor for driving either of them individually at rapid traverse rate.

8. In a machine tool, the combination with a base and a work table slidably mounted on said base, of mechanism for driving said table at a selected feed rate in either direction, and mechanism for driving said table at rapid traverse rate, said rapid traverse driving mechanism including an independent friction clutch for moving said table in each direction, whereby movement of said table in either direction at rapid traverse rate may be effected smoothly and conveniently.

9. In a machine tool, the combination with a base and a work table slidably mounted on said base, of mechanism for driving said table at a selected feed rate in either direction, mechanism for driving said table at rapid traverse rate, said rapid traverse driving mechanism including an independent friction clutch for moving said table in each direction, and a single control lever operatively connected to actuate said clutches alternatively, whereby movement of said table may be effected selectively in either direction at rapid traverse rate by appropriately moving said single control lever and without clashing of gears or positive clutches.

10. In a machine tool having a movable work supporting table, the combination with transmission mechanism operative to drive said table at feed rate or at rapid traverse rate selectively, of a trip arm disposed adjacent to said table and operative to change the rate of movement of said table, trip dogs carried by said table in position to act upon said trip arm, said dogs being arranged to operate in two paths respectively, and means associated with said transmission mechanism for moving said trip arm into a predetermined path of operation of said trip dogs in accordance with the direction in which said table is being driven.

11. In a machine tool rate changing and reversing mechanism, the combination with a driven element, of two trains each including an over-running clutch, said trains being connected to drive said element in opposite directions respectively, means including positive clutches arranged to be selectively coupled to the over-running clutch of the one or the other of said trains for driving said clutch and said element at slow rate, means including friction clutches arranged to be selectively coupled to the one or the other of said trains for driving said element at fast rate, power actuated means associated with said clutches for operating them, and control means responsive to movement of said driven element and operative to control said power actuated clutch operating means, whereby reversal of the direction of movement of said driven element may be effected automatically.

12. In a milling machine of the rail type having a base, a work table slidably mounted on said base, uprights at each side of said table, a rail carried by said uprights and a tool spindle carried by said rail, the combination with a source of power for driving said spindle and a speed changing mechanism carried by said rail for adjusting the speed of rotation of said spindle; of a source of power for moving said spindle relative to said rail and for moving said table relative to said base, means for establishing a common feed rate for moving said spindle or said table by said power source, means for effecting independent movement of either said spindle or said table by said power source at rapid traverse rate, and interlocking control means preventing feeding movement of said spindle or said table when said spindle power source is inoperative but permitting rapid traverse movement thereof.

13. In a milling machine of the rail type, provided with a bed, and supporting columns uprising from said bed; the combination with a rail slidably carried by said columns for vertical movement, a spindle supporting member slidably mounted on said rail, and a tool carrying spindle rotatably mounted in said spindle supporting member; of a speed changing mechanism mounted on said rail, said mechanism being operative to transmit power at a selected speed to said spindle supporting member, a driving motor mounted on said bed and adapted to drive said spindle, a power transmission train connected to transmit power from said motor to said speed changing mechanism, and means associated with said spindle supporting member effecting a power connection with said speed changing mechanism to drive said spindle at the selected speed.

14. In a milling machine of the rail type including a frame, a work table supported by said frame, uprights on said frame at the sides of said work table, a rail carried by said uprights for vertical movement relative to said work table, a tool spindle support mounted on said rail in manner to be movable relative thereto, and a tool supporting spindle rotatably mounted in said movable spindle support; the combination with a spindle driving motor mounted in said frame, and a speed rate changing mechanism mounted on said rail; of a transmission train connected to transmit power at relatively high speed from said motor to said speed changing mechanism, means to transmit power from said speed changing mechanism at a rate selected thereby to said tool spindle support, and means on said tool spindle support including a range changer connected to said power transmitting means and operative to transmit power to said tool spindle selectively in any one of a plurality of speed ranges.

15. In a milling machine having a bed, a work supporting table reciprocably mounted on said bed, and a pair of spindle supporting members fixed with said bed and uprising respectively at opposite sides of said table; the combination with a rail guided on said uprising members above said table and arranged for vertical movement relative thereto, a tool spindle supporting unit including a base slidably mounted on said rail for bodily movement relative thereto, and a tool spindle rotatably carried by said base for bodily movement therewith in cooperative relationship with said work table; of mechanism for driving said spindle including a power source carried by said bed, a speed changer mounted on said rail in manner to move bodily therewith, a transmission mechanism disposed to transmit power from said source to said speed changer at a substantially constant relatively high speed, said speed changer being operative to transmit power from said constant speed mechanism to said spindle supporting unit at a selected one of a plurality of speed rates, and means associated with said spindle supporting unit for transmitting the power delivered from said speed changer to said spindle to drive it at the selected speed.

16. In a milling machine of the rail type having a frame supporting a work-carrying table, the combination with a rail mounted for vertical movement relative to said table, a spindle carrier movably mounted on said rail, and a tool supporting spindle rotatably supported by said spindle carrier, of driving means for rotating said spindle, said means including a speed changing mechanism mounted on said rail and a range changing mechanism mounted on said spindle carrier and operative to transmit power from said speed changing mechanism to said spindle in any one of a plurality of speed ranges.

17. In a milling machine of the rail type having a frame supporting a work-carrying table, the combination with a rail mounted for vertical movement relative to said table, a spindle carrier mounted for longitudinal movement along said rail, a spindle head mounted for vertical movement on said spindle carrier, and a tool supporting spindle rotatably mounted in said spindle head, of driving means for rotating said spindle including a speed changing mechanism mounted on said rail, and a range changing mechanism mounted on said spindle head, said range changing mechanism being operative to transmit power from said speed changing mechanism to said spindle in any one of a plurality of speed ranges.

18. In a milling machine of the rail type having a frame supporting a work-carrying table, the combination with a rail mounted for vertical movement relative to said table, a spindle carrier mounted for longitudinal movement along said rail, a spindle head mounted for vertical movement on said spindle carrier, and a tool supporting spindle rotatably mounted in said spindle head, of driving means for rotating said spindle including a speed changing mechanism mounted on said rail, a range changing mechanism mounted on said spindle head, said range changing mechanism being operative to transmit power from said speed changing mechanism to said spindle in any one of a plurality of speed ranges, a speed indicating dial associated with said speed changing mechanism, and means associated with said range changing mechanism for identifying the reading of said dial which indicates the spindle speed resulting from the combined setting of said speed changing mechanism and said range changing mechanism.

19. In a milling machine, the combination with a movable work support and a tool spindle mounted for bodily movement, of a rate changing transmission mechanism selectively connectable to move said work support and said tool spindle at a selected feed rate, means selectively connectable to move said work support and said tool spindle alternatively at rapid traverse rate, and selective control mechanism arranged to connect either or both said work support and said tool spindle independently either to said feed rate transmission mechanism or to said rapid traverse rate moving means, whereby either said work support or said tool spindle may be moved at either feed rate or rapid traverse rate independently of the other.

20. A milling machine comprising a frame, a work support movably mounted on said frame, a tool spindle support movably mounted on said frame, a tool spindle rotatably mounted in said spindle support, means for driving said spindle, a transmission train for moving said spindle support including reversing mechanism, feed rate changing transmission mechanism, means to connect said feed rate changing transmission mechanism selectively to said spindle support transmission train, means to connect said feed rate changing transmission mechanism to said work support to drive it in either direction selectively, rapid traverse drive mechanism, means to connect said rapid traverse drive mechanism selectively to said spindle support moving transmission train, and means to connect said rapid traverse drive mechanism to said work support to drive it in either direction selectively, whereby either said work support or said spindle support may be moved in either direction either at rapid traverse rate or at feed rate independently of the direction or rate of movement of the other support.

21. A machine tool rate changing and reversing mechanism, comprising a driven element, two power transmitting trains operatively connected to drive said driven element in opposite directions respectively, two overrunning clutches connected to drive said trains respectively, a slow rate driving shaft, clutch means selectively engageable to connect said slow rate driving shaft to either of said overrunning clutches for actuating said driven element in either direction at slow rate, a fast rate driving shaft, and other clutch means selectively engageable to connect said fast rate driving shaft directly to either of said power transmitting trains for actuating said driven element in either direction at fast rate, said overrunning clutches permitting transition from slow rate to fast rate in the same direction without necessitating disengagement of the slow rate clutch, whereby the rate of movement of said driven element may be changed by engaging or disengaging said fast rate driving clutch means and the direction of movement at either rate may be changed by selectively engaging the corresponding clutch means.

22. In a rate changing and reversing mechanism for a machine tool, two power trains arranged to transmit motion in opposite directions respectively, a first clutch mechanism disposed to be engaged to drive the one or the other of said trains selectively at feed rate, a second clutch mechanism disposed to be engaged to drive the one or the other of said trains selectively at rapid traverse rate, and control means associated with said clutch mechanisms and effective to render said first clutch mechanism inoperative upon engagement of said second clutch mechanism, whereby said second clutch mechanism may be engaged to actuate either train at rapid traverse rate regardless of whether or not either train was being driven just previously by said first clutch mechanism.

23. A machine tool comprising a movable supporting member, mechanism including an overrunning clutch for driving said member at a selected feed rate in either direction selectively, and mechanism for driving said member alternatively at rapid traverse rate including an independent friction clutch for effecting movement in each direction, whereby rapid traverse movement in either direction may be effected readily and smoothly by said friction clutches or the rate of movement may be changed from feed to rapid traverse in the same direction by one of said friction clutches without disturbing the selective engagement of said feed rate driving mechanism.

24. A machine tool comprising a driven element, two power transmitting trains operatively connected to drive said element in different directions respectively, mechanism for driving each of said trains at a selected feed rate including an overrunning clutch, and mechanism for driving each of said trains alternatively at rapid traverse rate including an independent friction clutch for effecting movement in each direction, the arrangement being such that movement of said element at rapid traverse rate may be effected without disengaging the corresponding feed rate driving mechanism.

25. A machine tool comprising a driven element, two power transmitting trains operatively connected to drive said element in different directions respectively, mechanism for driving each of said trains at a selected feed rate including an overrunning clutch, mechanism for driving each of said trains alternatively at rapid traverse rate including an independent friction clutch for effecting movement in each direction, control means for selectively engaging said feed rate driving mechanism with one or the other of said trains, control means for selectively engaging one or the other of said rapid traverse friction clutches, and an interlocking mechanism operative to disengage said feed rate driving mechanism from one of said trains when said friction clutch control means is actuated to engage rapid traverse rate mechanism with the other of said trains, whereby rapid traverse movement of said driven element may be effected smoothly and conveniently in either direction by said friction clutch control means, said friction clutch control means being also alternatively capable of effecting change in rate of movement of said element in the direction determined by said feed rate control means.

26. A machine tool rate changing and reversing mechanism, comprising a driven element, two power transmitting trains operatively connected to drive said element in opposite directions respectively, two slow speed driving means each including an overrunning clutch disposed to be coupled selectively to said trains respectively to drive said element at feed rate in the one or the other direction, and two high speed driving means each including a friction clutch disposed to be engaged selectively to actuate said trains respectively for driving said element at rapid traverse rate in the one or the other direction, whereby power may be applied readily and smoothly to actuate said driven element in either direction at rapid traverse rate by selectively engaging one or the other of said friction clutches, or the rate of movement of said element may be changed from feed to rapid traverse by engaging one of said friction clutches with its train while the corresponding feed rate driving means is coupled to said train, the overrunning clutch permitting rapid traverse movement without disengagement of the feed rate driving means.

27. In a milling machine of the rail type, the combination with a bed, a rail supported for vertical movement relative to said bed, and a tool carrying spindle movably mounted on said rail; of a motor mounted on said bed and adapted to drive said tool spindle, a speed changing mechanism mounted on said rail and operative to transmit power at any selected one of a plurality of speeds, a transmission train connected to transmit power from said motor to said speed changing mechanism, and means to transmit power at a selected speed from said speed changing mechanism to said spindle.

28. A milling machine of the rail type, comprising a frame supporting a work-carrying table, a rail mounted on said frame for movement relative to said table, a spindle supporting head mounted on said rail for movement relative thereto, a tool spindle rotatably mounted in said spindle head, a spindle speed changing gear box mounted on said rail, means to drive said gear box, means to transmit power from said gear box to said spindle, and a speed indicating dial associated with said gear box and operative to indicate the speed at which said spindle is being driven.

29. A milling machine comprising a bed, a work supporting table mounted on said bed, a supporting column uprising adjacent to said bed, a rail guided for vertical movement on said column above said table, a tool spindle supporting unit slidably mounted on said rail, a tool spindle rotatably carried by said spindle supporting unit in cooperating relationship with said work table, a power source mounted in said bed, a speed changing mechanism fixed on said rail for bodily movement therewith, means carried by said rail for transmitting power from said speed changing mechanism to said relatively movable spindle to operate it at a selected speed, and a constant speed transmission train operative to transmit power from said power source in said bed to said speed changing mechanism, on said rail, whereby said spindle may be operated at low speed under high torque without subjecting said transmission train to high torque thereby avoiding deflection in said train which might otherwise cause vibration of said spindle.

30. In a milling machine, a supporting frame, a work table carried by said frame, a carrier mounted on said frame for movement relative thereto, a spindle supporting member mounted on said carrier for movement relative thereto, a tool spindle rotatably mounted in said supporting member, a spindle driving motor mounted in said frame, a spindle speed changing mechanism fixed on said carrier, means for transmitting power from said motor in said frame to said speed changing mechanism on said carrier, and means for transmitting power at the rate selected by said speed changing mechanism from said mechanism to said movably mounted spindle supporting member to drive said spindle at a predetermined speed.

31. A machine tool, comprising a movable supporting element, a transmission mechanism operative to drive said movable element alternatively at feed rate or at rapid traverse rate, control mechanism for changing the rate of movement of said supporting element including a trip arm disposed adjacent to the path of movement of said element and arranged for movement along a single path transverse to said path of movement of said element, a plurality of trip dogs carried by said element in position to act upon said trip arm and arranged to move along two distinct paths, and means associated with said control mechanism for effecting a partial movement of said trip arm along its path of movement to bring it into one or the other of said paths of trip dog movement for engagement by a predetermined one of said trip dogs.

32. In a rate changing and reversing mechanism for actuating a movable element of a machine tool, means for moving said element in either direction at feed rate, a feed lever disposed to control said feed means, means for moving said element in either direction at rapid traverse rate, a rapid traverse lever arranged to control said rapid traverse means, and an interlocking lost-motion mechanism interconnecting said levers for simultaneous partial movement in such manner that both levers are operative to disconnect either of said element moving means, whereby movement of said element in either direction at either rate may be stopped by means of either lever.

33. In a rate changing and reversing mechanism for actuating a movable member of a machine tool organization, means for moving said member in either direction at feed rate including a control lever having a stop position, means for changing the rate of movement from feed rate to rapid traverse rate including a second control lever having a stop position, and an interlocking lost-motion mechanism interconnecting said levers in such manner that when either lever is moved to its stop position the other lever is also moved to its stop position, whereby movement of said member may be stopped by means of either lever.

34. In a machine tool transmission and control mechanism, the combination with driving mechanism operative to move a movable machine tool element in either direction at either feed or rapid traverse rate selectively, of trip mechanism responsive to movement of said movable element and operative to change its rate of movement automatically, a manually actuatable rapid traverse lever operatively connected to effect movement of said movable element at rapid traverse rate in either direction selectively and operative to condition said trip mechanism to respond to movement of said element in the selected direction, and a manually actuatable feed lever operatively connected to effect movement of said movable element at feed rate in either direction selectively and having lost-motion connection with said rapid traverse lever for effecting partial movement thereof, said partial movement being sufficient to effect conditioning of said trip mechanism to respond to movement of said element in the selected direction.

35. In a machine tool, the combination with a base and a work table slidably mounted on said base, of mechanism for driving said table at a selected feed rate in either direction, said feed rate driving mechanism including an overrunning clutch for moving said table in each direction, and mechanism for driving said table at rapid traverse rate, said rapid traverse driving mechanism including an independent friction clutch for moving said table in each direction, whereby movement of said table in either direction at rapid traverse rate may be effected smoothly and conveniently without disengaging the corresponding feed rate driving mechanism.

36. In a machine tool rate changing and reversing mechanism, the combination with a driven element, of two trains each including an overrunning clutch, said trains being connected to drive said element in opposite directions respectively, means including positive clutches arranged to be selectively coupled to the overrunning clutch of the one or the other of said trains for driving said clutch and said element at slow rate, means including friction clutches arranged to be selectively coupled to the one or the other of said trains for driving said element at fast rate, power actuated means including a hydraulic motor associated with said positive clutches for operating them and a second hydraulic motor associated with said friction clutches for operating them, and a control system responsive to movement of said driven element and operative to actuate said hydraulic motors in manner automatically to effect reversal of the direction of movement of said driven element at a predetermined position in its path of travel.

37. In a machine tool rate changing and reversing mechanism, the combination with a driven element, of two trains each including an overrunning clutch, said trains being connected to drive said element in opposite directions respectively, means including positive clutches arranged to be selectively coupled to the overrunning clutch of the one or the other of said trains for driving said clutch and said element at slow rate, means including friction clutches arranged to be selectively coupled to the one or the other of said trains for driving said element at fast rate, power actuated means including a hydraulic motor associated with said positive clutches for operating them and a second hydraulic motor associated with said friction clutches for operating them, a control system responsive to movement of said driven element and operative to actuate said hydraulic motors in manner automatically to effect reversal of the direction of movement of said driven element at a predetermined position in its path of travel, and a selector associated with said control system and operative to select the mode of actuation of said hydraulic motors for predetermining the rate at which said automatic reversal will be effected.

JOSEPH B. ARMITAGE.